United States Patent [19]
Sudhoff et al.

[11] Patent Number: 6,051,941
[45] Date of Patent: Apr. 18, 2000

[54] NONLINEAR STABILIZING CONTROL FOR POWER ELECTRONIC BASED SYSTEMS

[75] Inventors: Scott D. Sudhoff, West Lafayette; Steven F. Glover, Lafayette, both of Ind.

[73] Assignee: P.C. Krause & Associates, Inc., West Lafayette, Ind.

[21] Appl. No.: 09/261,355

[22] Filed: Mar. 3, 1999

[51] Int. Cl.[7] .................................................. H02P 5/20
[52] U.S. Cl. ........................ 318/140; 318/727; 318/801; 318/432; 318/433; 318/434; 363/17
[58] Field of Search .................................. 318/140, 727, 318/801, 432, 433, 434; 363/17

[56] References Cited

U.S. PATENT DOCUMENTS 4,661,897  4/1987  Pitel .......................................... 318/140
4,910,438  3/1990  Farnsworth .............................. 318/140

*Primary Examiner*—Karen Masih
*Attorney, Agent, or Firm*—Woodard, Emhardt, Naughton, Moriarty & McNett

[57] ABSTRACT

Power electronic based power and propulsion systems are used in a wide variety of applications including locomotives, hybrid electric vehicles, aircraft, spacecraft, and ships. In general, the power electronic loads in such systems have tightly regulated outputs which causes them to behave as constant power loads exhibiting negative input impedances in a small signal sense. Such systems can be prone to negative impedance instability. The present invention mitigates negative impedance instability without the introduction of any passive or active devices into the system by providing nonlinear modulation of the power into the power electronic load.

16 Claims, 18 Drawing Sheets

Simplified Model of Synchronous Machine/Rectifier and Filter

Simplified Model of BDC and Buck/Boost Converter Load

Rest of the System

DC-to-DC Converter

NONLINEAR STABILIZING CONTROL FOR POWER ELECTRONIC BASED SYSTEMS

STATEMENT OF GOVERNMENT RIGHTS

This invention was made with U.S. Government support from the Naval Sea Systems Command under contracts N00024-93-C4180 and N61533-95-C-0107. The U.S. Government has certain rights in this invention.

TECHNICAL FIELD OF THE INVENTION

The present invention generally relates to control systems and, more particularly, to a method of preventing negative impedance instability in power electronics based systems.

BACKGROUND OF THE INVENTION

Power electronic based distribution and propulsion systems are important in a wide variety of applications including locomotives, hybrid electric vehicles, aircraft, spacecraft, and ship propulsion systems. The advantages of such systems include greater design flexibility and higher bandwidth control allowing a greater degree of optimization. In particular, for power electronic propulsion systems, the turbine speed becomes fully decoupled from the load speed, allowing the turbine speed to be optimized with regard to fuel efficiency. In addition, the elimination of the mechanical linkage between the turbine or other prime mover and the mechanical load (drive train or propeller) allows a greater degree of architectural freedom in the locomotive/vehicle/ship layout. In many electric propulsion systems consisting of a turbine driven synchronous machine feeding an induction motor drive through a rectifier—dc link—inverter frequency changer, the inverter is used to tightly regulate the motor current waveforms, which has the advantage of making the inverter/motor drive extremely robust with regard to preventing overcurrents. Power electronic converters used in power systems (ac-to-dc, dc-to-ac, and dc-to-dc) offer the advantages of higher efficiency and high bandwidth control. However, such high bandwidth regulation has the disadvantage that it makes the power electronic converters appear as negative impedance loads in a small signal sense. This negative impedance can result in dynamic instability of the power electronic system. In order to avoid such instability, it is known in the prior art to increase the dc link capacitance or add RC damping networks to the system. However, in large drive systems, such as those used in naval applications, the extra passive components can become costly in terms of space, weight, and maintenance (particularly in regard to identifying shorted capacitors in a large bank). There is, therefore, a need for a nonlinear stabilizing control which mitigates the negative impedance instability problem by shaping the input impedance of the power electronic converters without adding additional components to the system. The present invention is directed toward meeting this need.

SUMMARY OF THE INVENTION

Power electronic distribution and propulsion systems can be used in a wide variety of applications including locomotives, hybrid electric vehicles, aircraft, spacecraft, and ships. In general, the power electronic converters in these systems are regulated by high bandwidth controllers. Due to the tight regulation of the converter outputs, the small signal input impedance of the converters appears negative. This can result in the system becoming unstable. The present invention mitigates negative impedance instability without the introduction of any passive or active devices into the system by providing nonlinear modulation of the converter input power.

The preferred embodiment of the invention is as an outer most supervisory control around a power electronic load. This load may be an ac-to-ac, ac-to-dc, dc-to-dc, or dc-to-ac type of converter. Typically the converter has a tightly regulated output resulting in a negative input impedance in a small signal sense. If the output regulating control allows for direct or indirect modulation of the input power to the converter then the following steps can be taken to implement the invention: a) measure the input voltage of the power electronic load; b) filter the measured voltage using a low pass, stop band, or any other filter that will appropriately help shape the input impedance of the power electronic load; c) compute the control factor or output of the nonlinear stabilizing control as $$\left(\frac{\text{measured voltage}}{\text{filtered voltage}}\right)^n$$

wherein n is a real number that could be a constant or the result of a function; d) the control factor is then used to modulate the control signal generated by the power electronic load's output regulating control, resulting in a stable system.

In one form of the invention, a method for controlling negative impedance instability of a load coupled to a source of electric power is disclosed, comprising the steps of: a) receiving an input command indicative of a desired operating state of the load; b) determining a measured voltage by measuring an input voltage received from said source by said load; c) determining a filtered voltage by filtering said measured voltage; d) computing a control factor as $$\left(\frac{\text{said measured voltage}}{\text{said filtered voltage}}\right)^n$$

wherein n is a predetermined real number; e) determining a control signal by multiplying said input command by said control factor; and f) applying said control signal to said load in order to set an operating state of said load.

In another form of the invention, a method for controlling negative impedance instability of an electric propulsion system coupled to a source of electric power is disclosed, comprising the steps of: a) providing said electric propulsion system comprising an induction motor, an inverter controlling said induction motor, and a control circuit controlling said inverter; b) receiving an input command indicative of a desired torque of said induction motor; c) determining a measured voltage by measuring an input voltage received from said source by said electric propulsion system; d) determining a filtered voltage by filtering said measured voltage; e) computing a control factor as $$\left(\frac{\text{said measured voltage}}{\text{said filtered voltage}}\right)^n$$

wherein n is predetermined real number; f) determining a control signal by multiplying said input command by said control factor; and g) applying said control signal to said control circuit in order to determine a commanded torque of said induction motor.

In another form of the invention, a method for controlling negative impedance instability of a dc/dc converter coupled to a source of electric power is disclosed, comprising the steps of: a) receiving an input command indicative of a desired operating state of said converter; b) determining a measured voltage by measuring an input voltage received from said source by said converter; c) determining a filtered voltage by filtering said measured voltage; d) computing a control factor as $$\left(\frac{\text{said measured voltage}}{\text{said filtered voltage}}\right)^n$$

wherein n is a predetermined real number; e) determining a control signal by multiplying said input command by said control factor; and f) applying said control signal to said converter in order to set an operating state of said converter.

DETAILED DESCRIPTION OF THE PREFERRED EMBODIMENTS

Figure 1:
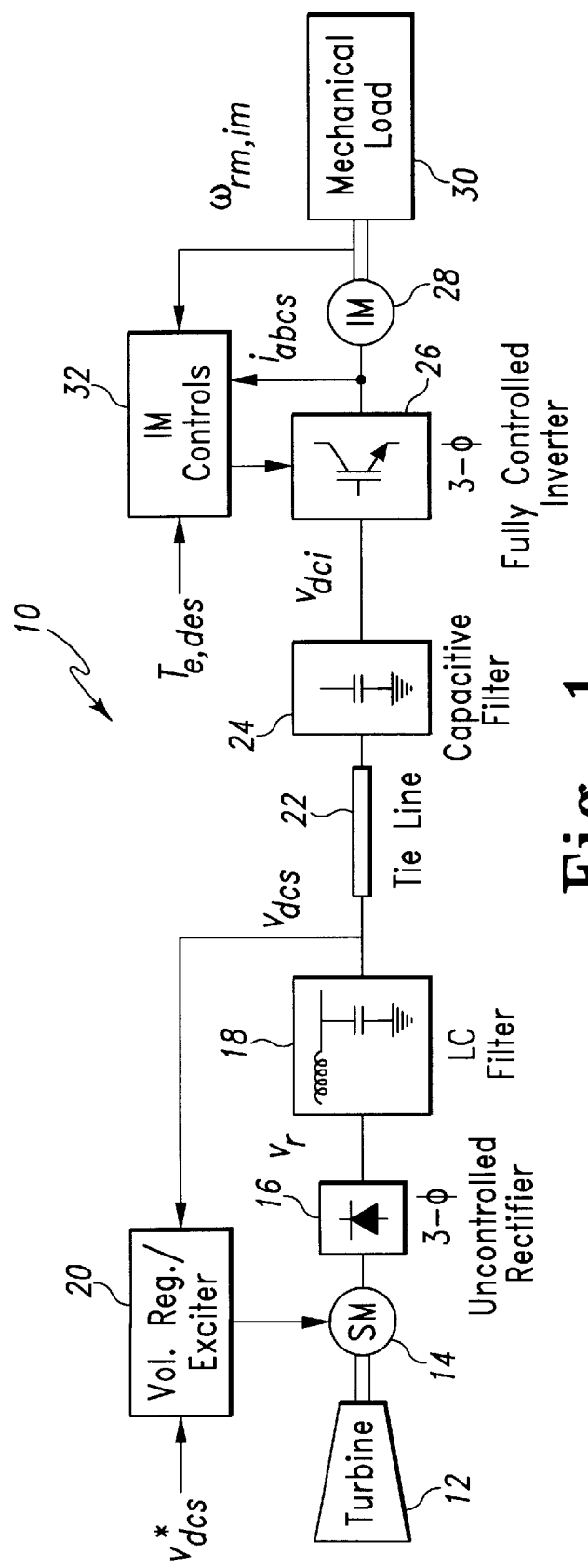
FIG. 1 is a schematic block diagram of an electric propulsion system to which a first embodiment of the present invention may be applied.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

FIG. 1 illustrates the type of electric propulsion system considered herein, indicated generally at 10. The power source of the system 10 is a diesel engine or turbine 12, which serves as a prime mover for the 3-phase synchronous machine (SM) 14. The 3-phase output of the machine 14 is rectified using an uncontrolled rectifier 16. The rectifier 16 output voltage is denoted $v_r$. An LC circuit 18 serves as a filter, and the output of the filter 18 is denoted $v_{dcs}$. A voltage regulator/exciter 20 adjusts the field voltage of the synchronous machine 14 in such a way that the source bus voltage $v_{dcs}$ is equal to the commanded bus voltage $v*_{dcs}$. The source bus is connected via a tie line 22 to the load bus, the voltage at which is denoted $v_{dci}$. The load bus consists of a capacitive filter 24 (which can include both electrolytic and polypropylene capacitance) as well as a 3-phase fully controlled inverter 26, which in turn supplies an induction motor 28. The induction motor 28 drives the mechanical load 30, which is rotating at a speed $\omega_{rm,im}$. Based upon the mechanical rotor speed, and the desired electromagnetic torque $T_{e,des}$ (which is determined by the controller governing the mechanical system), the induction motor controls 32 specify the on/off status of each of the inverter 26 semiconductors in such a way that the desired torque is obtained as is known in the art. Although the system 10 is quite robust with regard to overcurrents, and simple to design from the viewpoint that the controller governing the mechanical system is decoupled from the control of the electrical system (since the torque can be controlled nearly instantaneously), such systems are prone to be subject to a limit cycle behavior in the dc bus voltage known as negative impedance instability.

Figure 2:
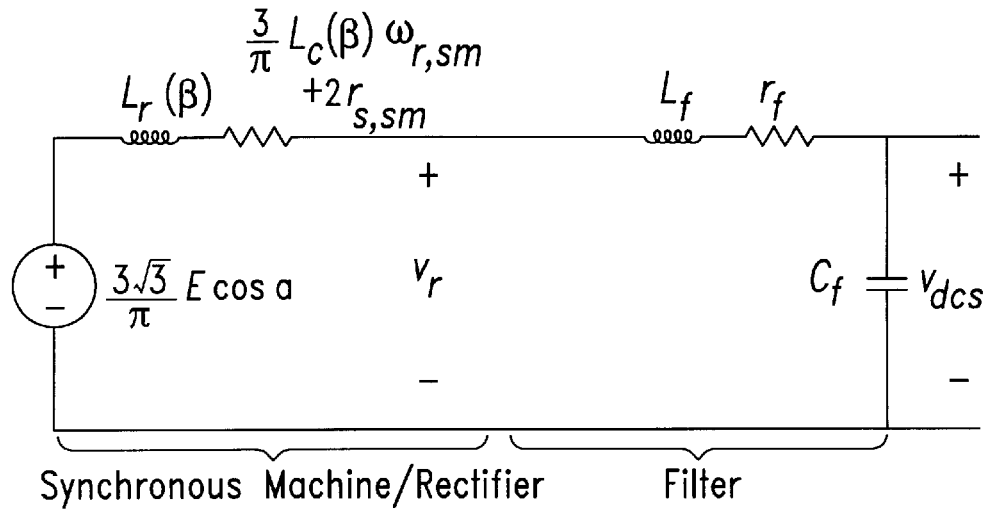
FIG. 2 is a schematic circuit diagram of a simplified model of the synchronous machine, rectifier and filter of FIG. 1.

In order to gain insight into the cause of negative impedance instability, it is appropriate to set forth a highly simplified model of the system 10 depicted in FIG. 1. This model focuses on the dc link dynamics and need only be valid in the tens to hundreds of hertz frequency band. An appropriate equivalent circuit of the synchronous machine/rectifier 14/16 and LC filter 18 is illustrated in FIG. 2. Therein, the dynamics of both the prime mover 12 and voltage regulator 20 are neglected since these are subject to long time constants imposed by the prime mover 12 inertia and synchronous machine 14 field, respectively. The dc voltage behind the inductance and resistance synchronous machine model of FIG. 2 has been shown in the prior art to have excellent bandwidth. In FIG. 2, $$E = \omega_{r,sm}\sqrt{(\lambda_q'')^2 + (\lambda_d'')^2} \quad (1)$$

Where $\omega_{r,sm}$ is the electrical rotor speed of the synchronous machine 14 and $\lambda''_q$ and $\lambda''_d$ are the q- and d-axis subtransient flux linkages, $\alpha$ is the firing angle relative to the subtransient back emf, $L_c(\beta)$ and $L_t(\beta)$ are the commutating and transient commutating inductances defined by $$L_c(\beta) = \frac{1}{2}(L_q'' + L_d'') + (L_d'' - L_q'')\sin\left(2\beta + \frac{\pi}{6}\right) \quad (2)$$

and $$L_t(\beta) = L_q'' - L_d'' + (L_d'' - L_q'')\sin\left(2\beta - \frac{\pi}{6}\right) \quad (3)$$

where $\beta$ is the firing angle relative to rotor position and $L''_1$ and $L''_d$ are the synchronous machine 14 q- and d-axis subtransient inductances, $r_{s,sm}$ is the synchronous machine 14 stator resistance, $L_f$ and $r_f$ are the inductance and resistance of the LC filter 18 inductor, and $C_f$ is the capacitance of the LC filter 18 capacitor.

Figure 3:
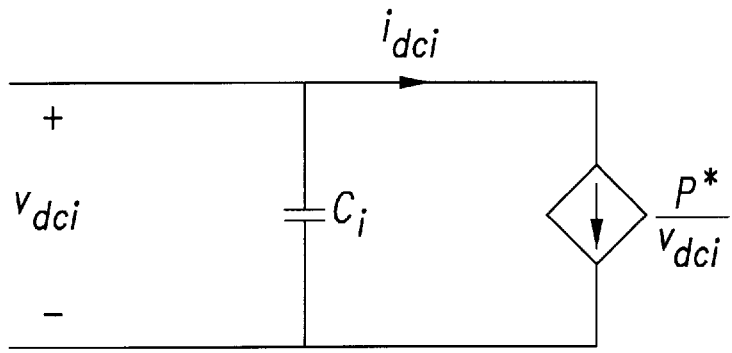
FIG. 3 is a schematic circuit diagram of a simplified model for the capacitive filter and induction motor drive of FIG. 1.

A highly simplified model of the capacitive filter 24 and inverter 26 is illustrated in FIG. 3. Therein, all losses in the machine 28 and inverter 26 are neglected whereupon the drive is modeled as a dependent current source equal to the instantaneous power P divided by dc link voltage $v_{dci}$ and where it is assumed that the instantaneous power is equal to the instantaneous power command P* defined as $$P^* = \omega_{rm,im}T^*_e \quad (4)$$

In (4), $T^*_e$ is an instantaneous torque command, which is the input to the field oriented induction motor control 32. Typically, the instantaneous torque command $T^*_e$ is set equal to the desired torque $T_{e,des}$. However, the control algorithm described herein also comprehends an alternate relationship.

Figure 4:
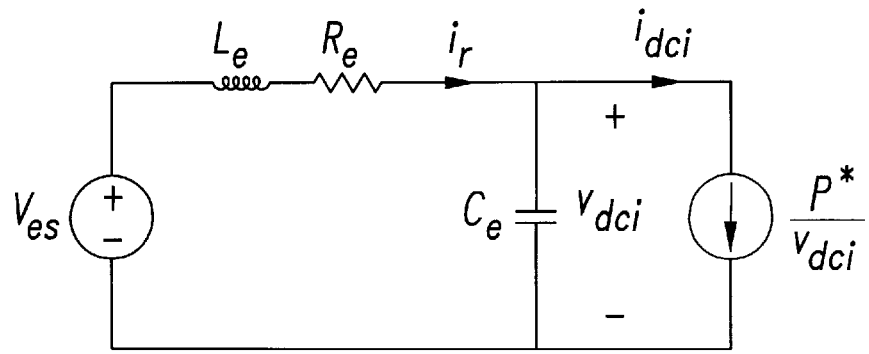
FIG. 4 is a schematic circuit diagram of a simplified model for a dc link of FIG. 1.

Upon neglecting the tie line 22, which is generally short in an electrical sense for the frequency range of interest, the component models illustrated in FIG. 2. and FIG. 3. are combined as FIG. 4.

Therein $$L_e = L_t(\beta) + L_f \quad (5)$$

$$R_e = \frac{3}{\pi}L_C(\beta)\omega_{r,sm} + 2r_{s,sm} + r_f \quad (6)$$

$$C_e = C_f + C_i \quad (7)$$

$$v_{es} = \frac{3\sqrt{3}}{\pi}E\cos(\alpha) \quad (8)$$

In (5–8), $\alpha$ and $\beta$ can be found by steady-state analysis of the load commutated converter rectifier system. However, the calculation can be made much simpler by noting that the rectifier 16 is uncontrolled and by neglecting subtransient saliency whereupon $$\alpha=0$$

and the commutating and transient commutating inductances are no longer a function of $\beta$. Furthermore, due to the action of the voltage regulator, the subtransient inductances will have a value such that $$v_{es} = v^*_{es} \quad (10)$$

so that no subtransient information is actually needed. It should be cautioned that this model is intended for explanation purposes and for guidance in designing control algorithms, not for high-fidelity simulation or for the testing of control algorithms.

In order to utilize this equivalent circuit to predict negative impedance stability, note that linearizing the input current with respect to input voltage about an operating point, wherein $v_{dci}$ is equal to $v^*_{dcs}$, yields $$\Delta i_{dci} = -\frac{P^*}{v^{*2}_{dcs}}\Delta v_{dci} \quad (11)$$

from which it is apparent that the small signal inverter 26 input impedance is $$Z_{inv} = -\frac{v^{*2}_{dcs}}{P^*} \quad (12)$$

As can be seen, in a small signal sense the inverter 26 appears as a negative resistance which, from an intuitive point of view, would seem to be destabilizing.

In order to verify this conclusion, replacing the dependent source representing the inverter 26 with its small signal equivalent impedance yields the following small signal model of the equivalent circuit $$\frac{d}{dt}\begin{bmatrix} \Delta i_r \\ \Delta v_{dci} \end{bmatrix} = \begin{bmatrix} -\frac{R_e}{L_e} & -\frac{1}{L_e} \\ \frac{1}{C_e} & \frac{P^*}{v_{dcs}^{*2} C_e} \end{bmatrix} \begin{bmatrix} \Delta i_r \\ \Delta v_{dci} \end{bmatrix} + \begin{bmatrix} \frac{1}{L_e} \\ 0 \end{bmatrix} \Delta v_{es} \quad (13)$$

which has a characteristic equation of $$\lambda^2 + \left(\frac{R_e}{L_e} - \frac{P^*}{C_e v_{dcs}^{*2}}\right)\lambda + \left(\frac{1}{L_e C_e} - \frac{P^* R_e}{C_e L_e v_{dcs}^{*2}}\right) = 0 \quad (14)$$

From (14) it follows that necessary conditions for stability are that $$\frac{v_{dcs}^{*2}}{P^*} > R_e \quad (15)$$

and that $$\frac{R_e}{L_e} > \frac{P^*}{C_e v_{dcs}^{*2}} \quad (16)$$

Equations (15) and (16) both limit the maximum power command, however (16) is normally the dominant constraint.

In order to avoid negative impedance instability, one method is to simply increase $C_e$ until the system 10 is stable to the maximum possible power command However, this has the disadvantage in that for very large drive systems the physical size and weight of this capacitance becomes an issue, especially considering the fact that the applications are largely mobile in nature. In addition, large capacitor banks are also undesirable from a maintenance point of view since identifying a shorted capacitor in a large bank is time-intensive. This is significant since electrolytic capacitors have relatively low reliability. Hereinbelow, a control is set forth which eliminates the need to increase the capacitance in order to satisfy (16). In addition to ensuring stability, the control of the present invention can be used to improve damping even if the system is already stable, and, in the case of small drives, may make it possible to entirely eliminate electrolytic capacitance from some systems, thereby eliminating one of the traditionally least reliable drive components.

One embodiment of the present invention comprises a function which improves the damping of the dc link by eliminating the negative impedance effect over a prescribed bandwidth. This function is based upon the fact that torque control in a field-oriented drive is nearly instantaneous. As described hereinabove, typically the instantaneous torque command $T^*_e$ is set equal to the desired torque $T_{e,des}$ as determined by the control function governing the mechanical system. However, the present invention determines the instantaneous torque command as $$T_e^* = \left(\frac{v_{dci}}{\tilde{v}_{dci}}\right)^n T_{e,des} \quad (17)$$

where $v_{dci}$ is the filtered dc inverter voltage, i.e., $$\frac{d\tilde{v}_{dci}}{dt} = \frac{v_{dci} - \tilde{v}_{dci}}{\tau} \quad (18)$$

and the parameters n and τ are considered to be constants herein but could also be made to be a function of operation point (i.e., any predetermined real number).

The advantage of this readily implemented though nonlinear control function is that it is extremely straightforward to implement yet highly effective in mitigating negative impedance instabilities. In order to illustrate the effect of the function on the system 10 note that using the control law (17), the input power into the inverter 26 is given by $$P = \left(\frac{v_{dci}}{\tilde{v}_{dci}}\right)^n P_{des} \quad (19)$$

where $$P_{des} = T_{e,des} \omega_{rm,im} \quad (20)$$

From (19) the input current may be expressed $$i_{dci} = \frac{v_{dci}^{n-1}}{\tilde{v}_{dci}^n} P_{des} \quad (21)$$

Linearizing (21) about the desired operating point ($v_{dci} = v_{dci} = v^*_{dcs}$) yields $$Z_{inv} = \frac{1}{n-1} \frac{v_{dcs}^{*2}}{P_{des}} \quad (22)$$

If τ is large compared to the time scale of the dc link dynamics and n is selected to be unity, then the input impedance presented by the inverter 26 is infinite over the frequency range in which negative impedance instabilities occur, thus avoiding this type of instability.

Although the explanation in the previous paragraph illustrates the basic philosophy of the control, the possibilities of the control are much richer than is indicated therein. In particular, by suitable selection of τ and n a large variety of behaviors can be obtained. In order to see this, it is helpful to first set forth the nonlinear differential equation governing the dc link dynamics in the presence of the control of the present invention. In particular, $$\frac{d}{dt}\begin{bmatrix} i_r \\ v_{dci} \\ \tilde{v}_{dci} \end{bmatrix} = \begin{bmatrix} -\frac{R_e}{L_e} & -\frac{1}{L_e} & 0 \\ \frac{1}{C_e} & 0 & 0 \\ 0 & \frac{1}{\tau} & -\frac{1}{\tau} \end{bmatrix} \begin{bmatrix} i_r \\ v_{dci} \\ \tilde{v}_{dci} \end{bmatrix} + \begin{bmatrix} 0 \\ -\frac{1}{C_e}\frac{P_{des}}{v_{dci}}\left(\frac{v_{dci}}{\tilde{v}_{dci}}\right)^n \\ 0 \end{bmatrix} + \frac{1}{L_e}[1\ 0\ 0]^T v_{es} \quad (23)$$

Linearization of (23) yields $$\frac{d}{dt}\begin{bmatrix} \Delta i_r \\ \Delta v_{dci} \\ \Delta \tilde{v}_{dci} \end{bmatrix} = \begin{bmatrix} -\frac{R_e}{L_e} & -\frac{1}{L_e} & 0 \\ \frac{1}{C_e} & -\frac{(n-1)}{C_e}\frac{P_{des}}{v_{dcs}^{*2}} & \frac{n}{C_e}\frac{P_{des}}{v_{dcs}^{*2}} \\ 0 & \frac{1}{\tau} & -\frac{1}{\tau} \end{bmatrix} \begin{bmatrix} \Delta i_r \\ \Delta v_{dci} \\ \Delta \tilde{v}_{dci} \end{bmatrix} + \quad (24)$$

$$\frac{1}{L_e}\begin{bmatrix} 1 & 0 & 0 \end{bmatrix}^T v_{es}$$

Figure 5:
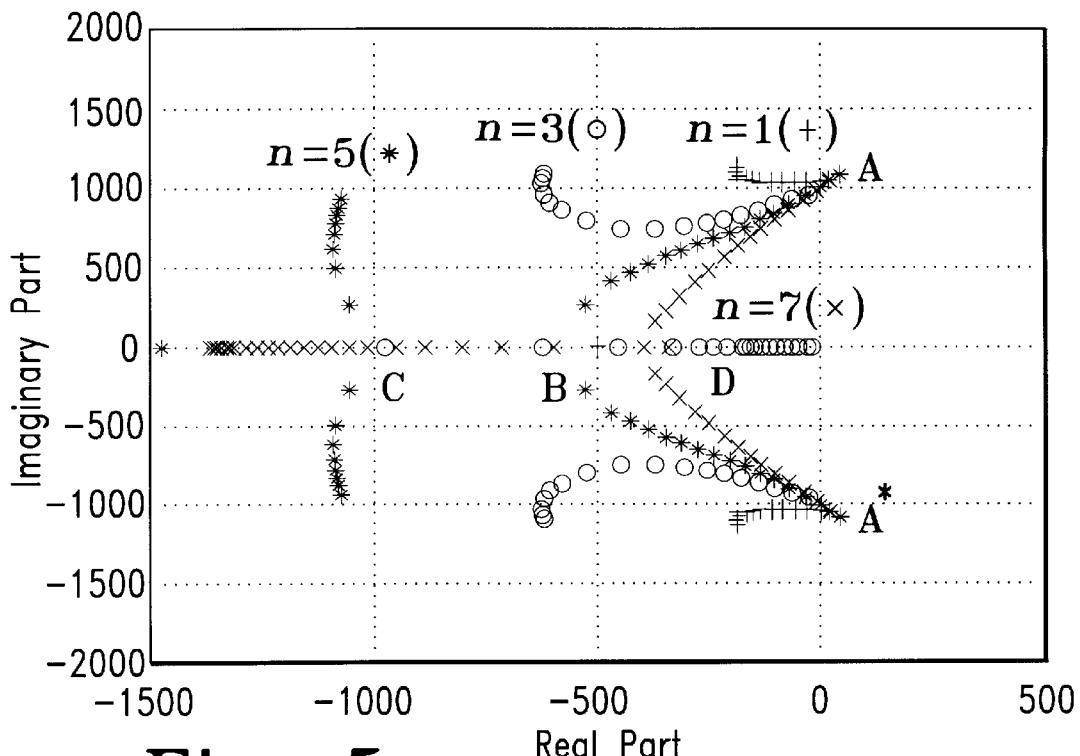
FIG. 5 is a partial root locus diagram of the system poles of a first embodiment control function as τ and n are varied.

In order to illustrate the effects of varying n and τ, consider the case of a system in which $v^*_{es}$=400V, $R_e$=4.58 Ω, $L_e$=13.9 mH, and $C_e$=51.4 μF. These parameters correspond to a test system which was used by the present inventors for laboratory experimentation. FIG. 5 illustrates the root loci of the characteristic equation as τ is varied from 0.1 ms to 1 s for n=1, 3, 5, and 7. (It should be noted that n does not have to be an integer.) As can be seen, in each case the root locus contains an unstable complex pole (denoted A and A*) for small values of τ which becomes stable as τ is increased. For all n shown in FIG. 5, the real part of the eigenvalues becomes more negative as τ is increased. In addition, initially the complex part also decreases. In the case of n=5, eventually the complex pair becomes real (point B) and then one of these real roots meets the root corresponding to the filter at point C, at which point this pair of eigenvalues becomes complex. In the case of n=7, the two complex poles eventually become real at point D; after which the pair moves away from each other on the real axis.

Figure 6:
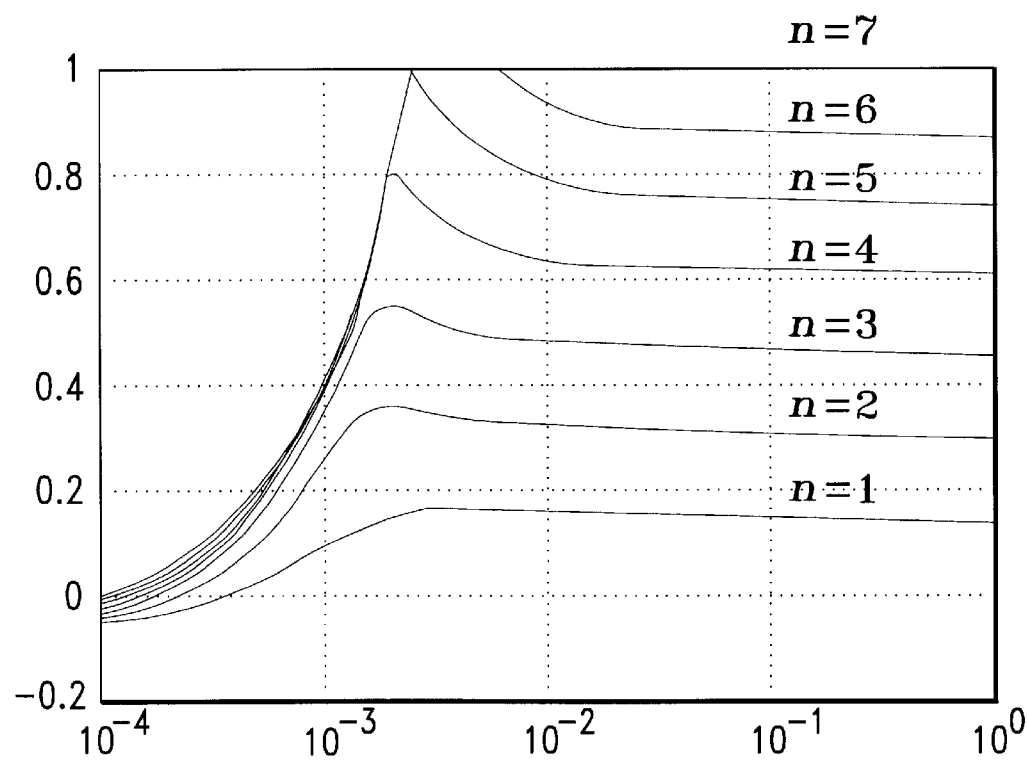
FIG. 6 is a graph illustrating the damping of the complex pole pair of FIG. 5 with a first embodiment control function of the present invention as n and τ are varied.

FIG. 6 illustrates the damping of the complex pole pair as n and τ are varied. Note that for each value of n, there is a value of τ which maximizes the damping. It is also apparent that, generally speaking, as n is increased, the damping can be increased.

Figure 7:
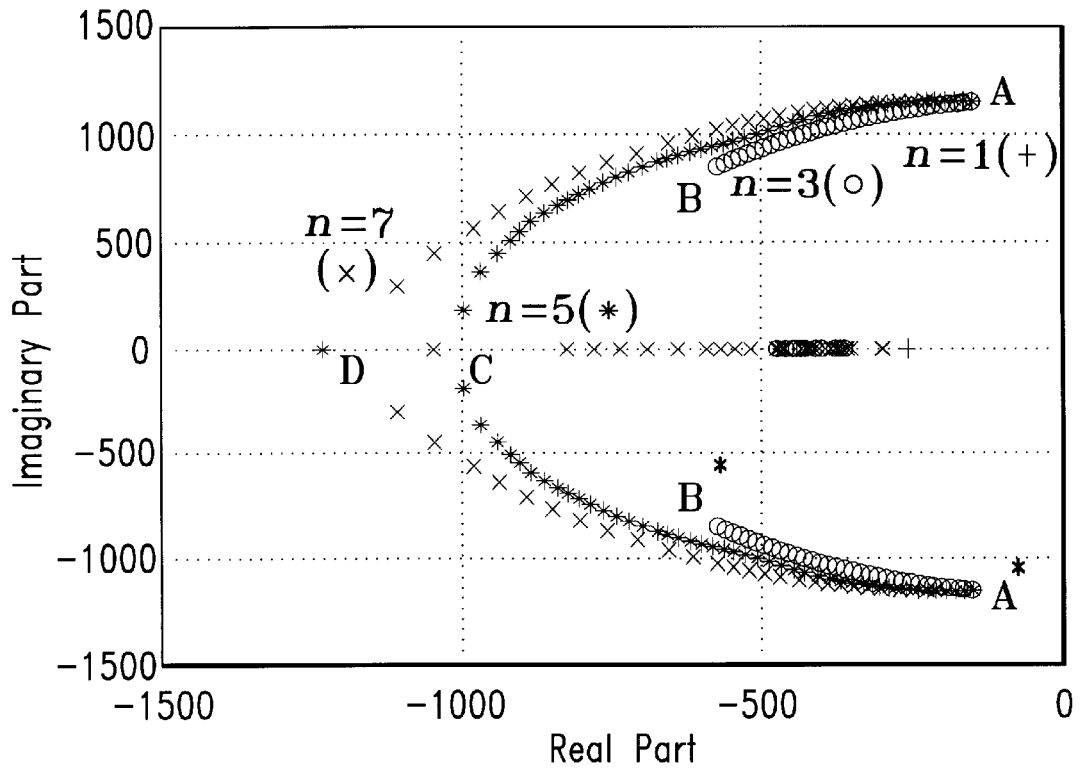
FIG. 7 is a partial root locus diagram of the system poles with a first embodiment control function of the present invention as P* and n are varied.

Since the control law is nonlinear, the eigenvalues will be a function of operating point, and so it is desirable to investigate the performance of the control as the operating point (primarily through power command) is varied. FIG. 7 illustrates the root locus of the system as power command is varied with (n=1, τ=ms), (n=3, τ=2.4 ms), (n=5, τ=2.7 ms), and (n=7, τ=3.1 ms). In each case, τ was selected so as to maximize the damping factor of the complex pole pair. As can be seen from FIG. 7, at low power the complex eigenvalue of the system is at point (A, A*) regardless of n. In the case of (n=1), the location of the roots is power level independent. However, in the case of n=3, the complex pair moves to (B, B*). Finally, in the case of n=5, and n=7, the complex eigenvalues become real at point C and D, respectively. This illustrates an important feature of the control law of the present invention, which is that although with the standard control (n=0), the system becomes less stable as the power level increases, with the control law of the present invention, the system actually becomes more stable as the power level increases, with the exception of (n=1), in which case the eigenvalues associated with the dc link become largely operating point invariant.

Figure 8:
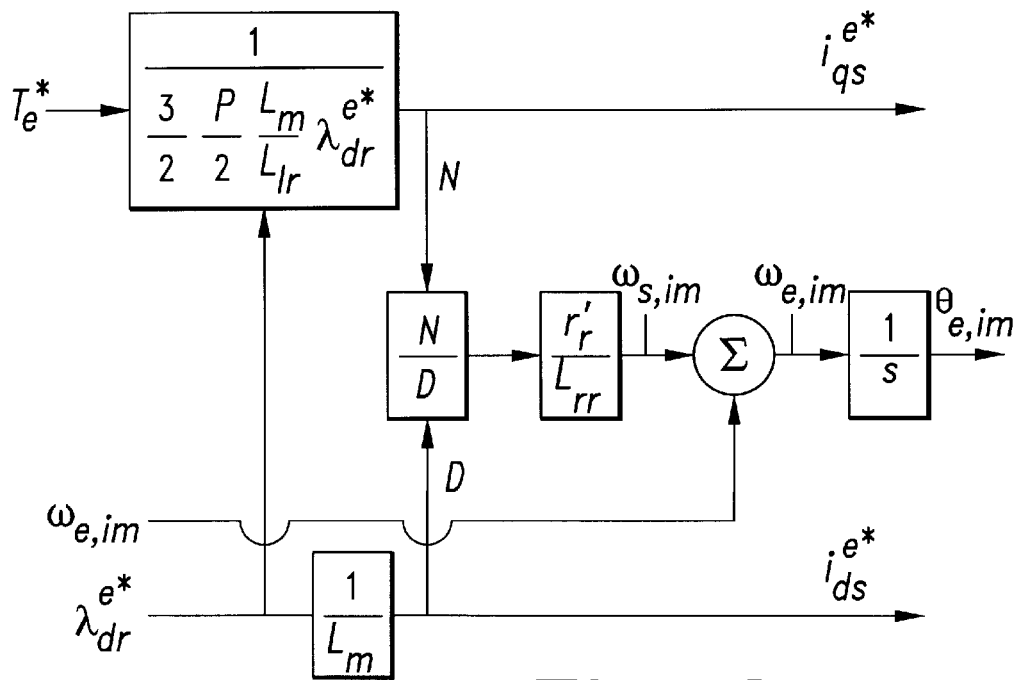
FIG. 8 is a schematic block diagram of a rotor flux oriented indirect field oriented control function.

Before setting forth an example of the implementation of the controller of the present invention, it is appropriate to first consider a standard field oriented control such as the rotor flux indirect field oriented control illustrated in FIG. 8. (Note that the control of the present invention is, however, independent of whether or not the field-oriented control is direct or indirect.) Therein, an instantaneous torque command $T^*_e$ is the input to the controller. This torque command is equal to the torque desired by the controller governing the mechanical dynamics, $T_{e,des}$. As can be seen, based on the torque command $T^*_e$ and desired d-axis rotor flux level $\lambda^{e*}_{dr}$, the desired q- and d-axis stator currents, $i^{e*}_{qs}$ and $i^{e*}_{ds}$, are determined. This calculation is a function of the induction motor magnetizing inductance $L_m$, the induction motor rotor inductance (rotor leakage plus magnetizing) $L'_{rr}$, the rotor resistance $r'_r$, and the number of poles, $N_{p,im}$. Based on the q- and d-axis stator currents, the electrical radian slip frequency, $\omega_{s,im}$, is determined, which is then added to the electrical rotor speed $\omega_{r,im}$ in order to determine the electrical speed of the synchronous reference frame $\omega_{e,im}$, which is integrated in order to determine the position of the synchronous reference frame $\theta_{e,im}$. In addition to the function illustrated in FIG. 8, especially in large drives, the field-oriented control will often include an on-line parameter identification algorithm to compensate for variations of the rotor time constant Once the q- and d-axis current commands and the position of the synchronous reference frame are established, these currents may be synthesized in a variety of ways. Herein, the q- and d-axis current command was transformed back into an abc variable current command, which is an input to a hysteresis type current control.

Figure 9:
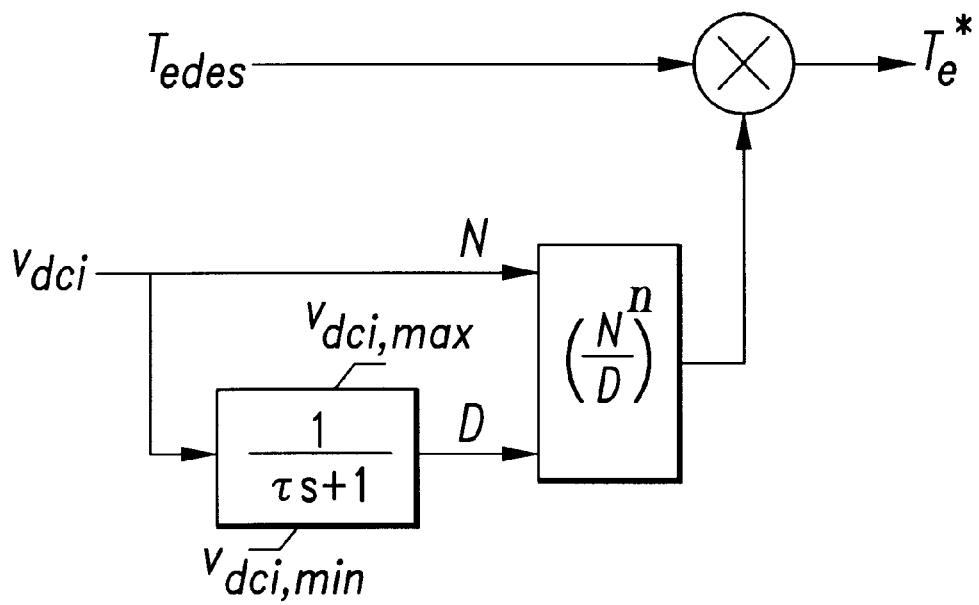
FIG. 9 is a schematic block diagram of a first embodiment nonlinear stabilizing control function of the present invention.

Incorporating the link stabilizing control of the present invention into the field-oriented control 32 is quite straightforward. In particular, the only difference in the control is that the instantaneous torque command is generated using (16) rather than being set equal to the desired torque, as is illustrated in FIG. 9.

Figure 10:
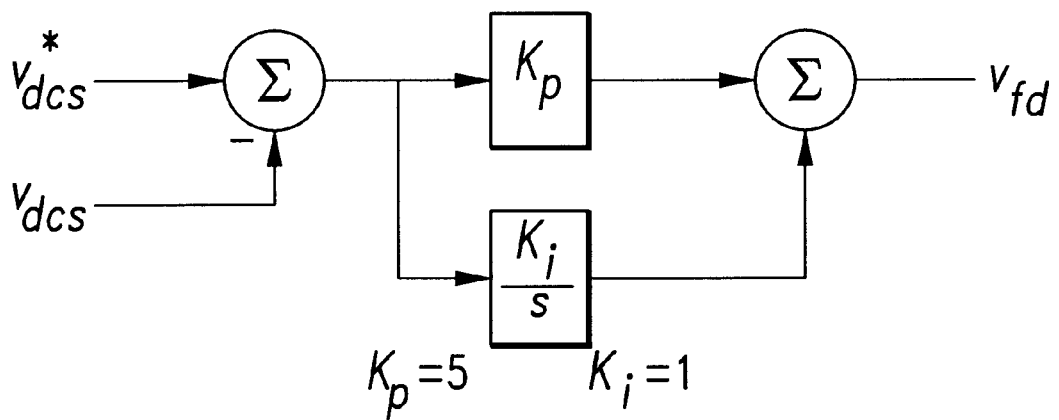
FIG. 10 is a schematic block diagram of a solid state exciter voltage regulator.

In order to experimentally verify the above control scheme, a system such as the one depicted in FIG. 1 was constructed at a low (3.7 kW) power level. The prime mover 12 was a dynamometer in speed control mode. The parameters of the 3.7 kW synchronous machine 14 are listed in Table 1. Therein, all rotor parameters have been referred to the stator by the appropriate turns ratio. A solid state voltage regulator/exciter 20 was used to control the dc link voltage; a block diagram of this control appears in FIG. 10. The LC filter 18, transmission line 22, and inverter 26 capacitance parameters are listed in Table 2. Those having ordinary skill in the art will note that the capacitor values are small for this power rating. This was desirable to mimic conditions which exist on much larger drives used for ship propulsion. Finally, a 3.7 kW induction motor was used as a load 28. Induction motor 28 parameters are listed in Table 3. The indicated motor control 32 was implemented based on the indirect rotor flux strategy with a rotor flux linkage command of 0.45 Vs, and the current command was synthesized using hysteresis current control with a hysteresis band of 0.95 A. The link stabilizing controller parameters were n=1, τ=4 ms, $v_{dcmin}$=200 V, and $v_{dcmax}$=600 V.

TABLE 1

Synchronous machine parameters

| | | |
|---|---|---|
| $r_{s,sm}$ = 382 mΩ | $L_{ls}$ = 0.83 mH | P = 4 |
| $L_{mq}$ = 13.5 mH | $L_{md}$ = 39.7 mH | $n_{sfd}$ = 0.0271 |
| $r_{kq1}$ = 31.8 Ω | $L_{lkq1}$ = 6.13 mH | $r_{fd}$ = 122 mΩ |
| $r_{kq2}$ = 0.923 Ω | $L_{lkq2}$ = 3.4 mH | $L_{lfd}$ = 2.54 mH |
| $r_{kd1}$ = 40.47 Ω | $L_{lkd1}$ = 4.73 mH | |
| $r_{kd2}$ = 1.31 Ω | $L_{lkd2}$ = 3.68 mH | |

TABLE 2

Passive component parameters.

| $L_f$ = 9.17 mH | $r_f$ = 3.01 Ω | $C_f$ = 10.1 μF |
|---|---|---|
| $L_{line}$ = 28.8 μH | $r_{line}$ = 273 mΩ | $C_1$ = 41.3 μF |

TABLE 3

Induction motor parameters.

| $r_s$ = 400 mΩ | $L_{ls}$ = 5.73 mH | $L_m$ = 64.3 mH |
|---|---|---|
| $r_r'$ = 227 mΩ | $L_{lr}'$ = 4.94 mH | $N_p$ = 4 |

The performance of the nonlinear stabilizing control of the present invention was validated using both a detailed (as opposed to average value/reduced order) computer simulation and in hardware tests. For the purposes of computer simulation, the synchronous machine and induction motor models were those set forth in *Analysis of Electric Machinery* by P. C. Krause. In the case of the salient pole synchronous machine 14, magnetic saturation was represented in the d-axis. The simulation included the switching of each power semiconductor device. Semiconductor conduction losses were included though switching losses were neglected.

Figure 11:
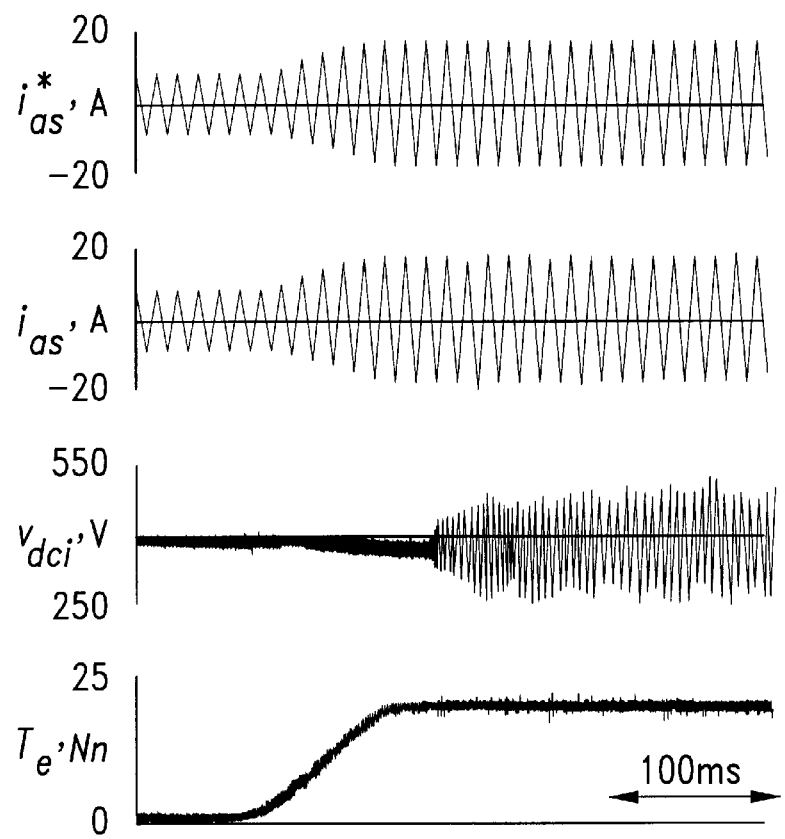
FIG. 11 is a graph illustrating simulated performance of a standard field oriented control function during a ramp increase in the desired torque.
Figure 12:
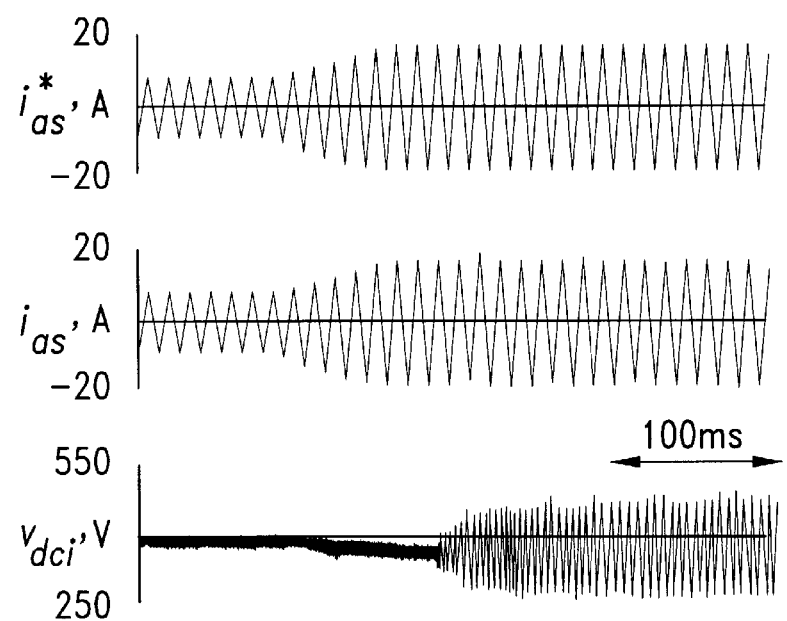
FIG. 12 is a graph illustrating measured performance of a standard field oriented control function during a ramp increase in the desired torque.

FIG. 11 illustrates the simulated performance of the system as the desired torque is changed from 2 to 19 Nm over a period of 100 ms. Variables depicted include the commanded a-phase current $i^*_{as}$, the actual a-phase current $i_{as}$, the dc inverter voltage $v_{dci}$, and the electromagnetic torque $T_e$. Although the actual torque closely tracks the desired torque, it can be seen that as the torque (and hence power command) increases, the dc bus voltage becomes unstable, stressing both the semiconductors and the capacitors. In a typical system, such behavior could easily result in the semiconductor and/or capacitor failure. The experimental system was constructed so as to be able to survive the overvoltages. FIG. 12 depicts the same study as measured in the laboratory. In FIG. 12, the instantaneous electromagnetic torque is not shown because suitable instrumentation was not available. As can be seen, there is a reasonable correspondence between FIG. 11 and FIG. 12 with the exception that the actual system appears to be less stable than is predicted by the simulation. This is because the power requirements of the actual drive system are greater than the simulated system because of switching losses. (It should be noted that the magnitude of the voltage swing increases very rapidly with power level.) In addition, once a system becomes unstable, it tends to be very sensitive to parameter variations.

Figure 13:
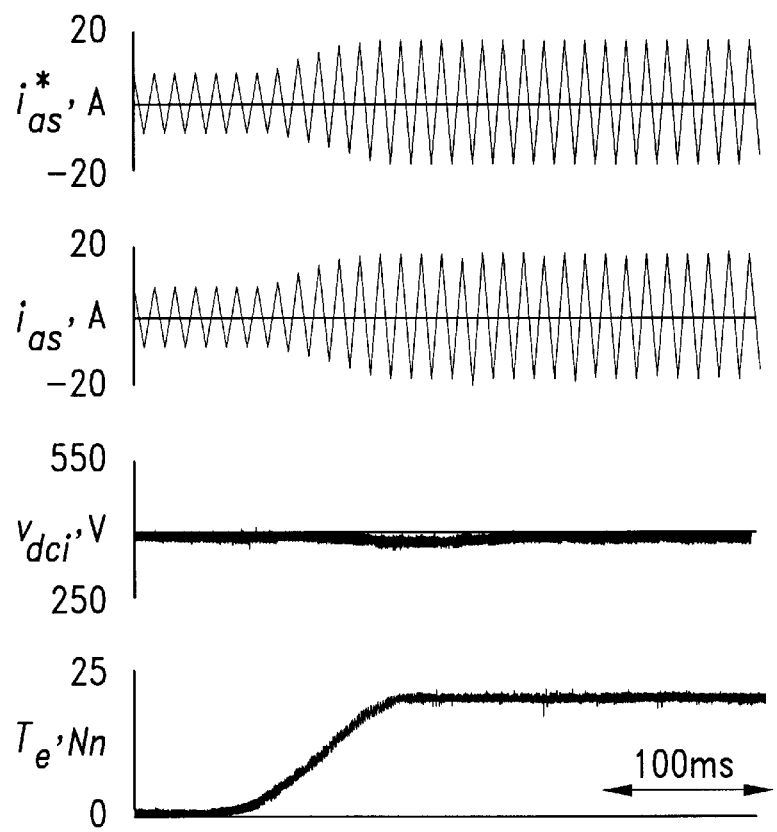
FIG. 13 is a graph illustrating simulated performance of a first embodiment nonlinear stabilizing control function of the present invention during a ramp increase in the desired torque.
Figure 14:
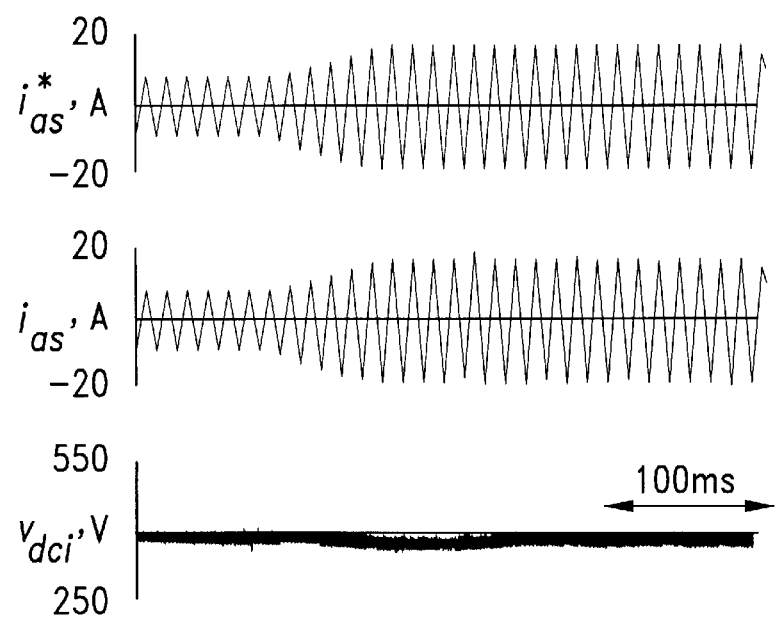
FIG. 14 is a graph illustrating measured performance of a first embodiment nonlinear stabilizing control of the present invention during a ramp increase in the desired torque.

FIG. 13 depicts the performance of the same system with the nonlinear stabilizing control of the present invention as calculated using the computer simulation. As can be seen, according to the simulation, the torque still closely tracks the commanded torque. Furthermore, in this case there is no evidence of instability. FIG. 14 illustrates the system performance as measured in the laboratory. As predicted, the dc bus voltage is well behaved, and the dc link voltage is stable.

Figure 15:
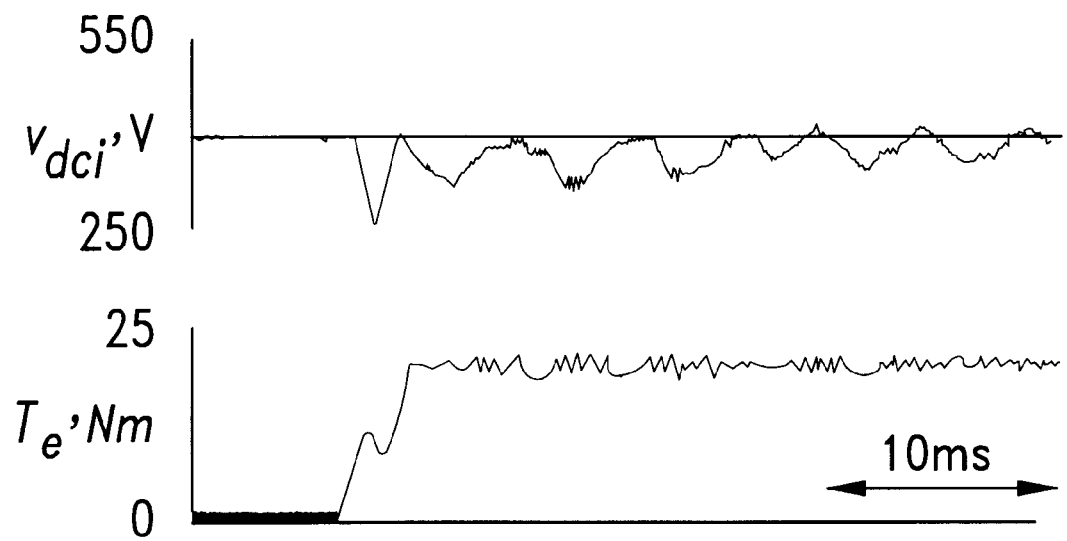
FIG. 15 is a graph illustrating simulated performance of a standard field oriented control function during a step change in the desired torque.
Figure 16:
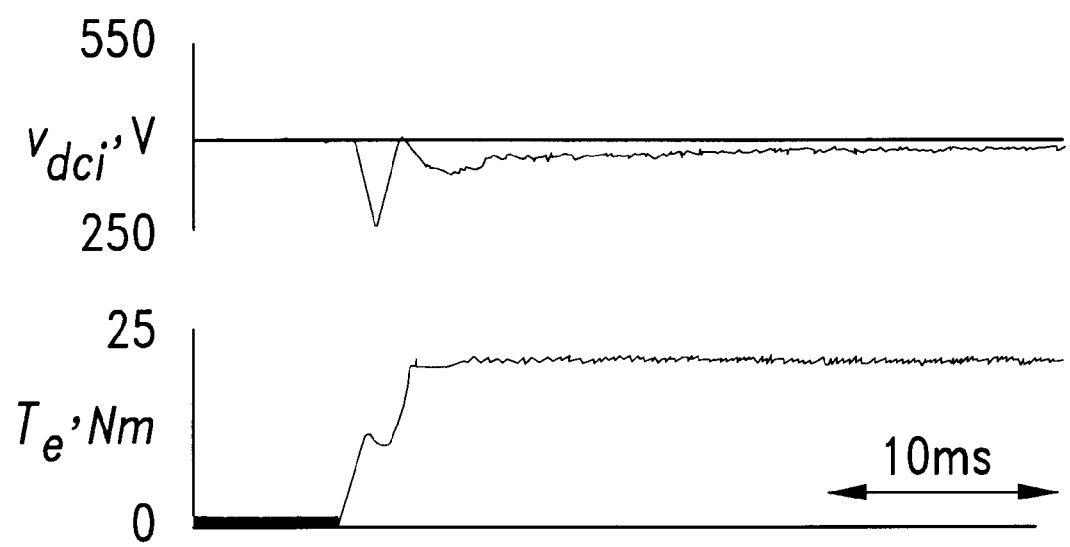
FIG. 16 is a graph illustrating simulated performance of a first embodiment nonlinear stabilizing control function of the present invention during a step change in the desired torque.

One concern which may arise is a possible reduction in torque bandwidth since a drop in inverter 26 voltage will result in a transient dip in torque. The detailed computer simulation was used to investigate this effect since the primary variable of interest was the electromagnetic torque. FIG. 15 depicts the predicted change of performance of the prior art field oriented control as the torque command is stepped from 2 to 19 Nm. As can be seen, the electromagnetic torque reaches the commanded value in approximately 5 ms. The torque response is not instantaneous due to the fact that a step change in current cannot be achieved in practice and because the dip in link voltage causes a temporary loss of current tracking in the hysteresis current control. FIG. 16 depicts the response with the nonlinear stabilizing control of the present invention. In this case, the electromagnetic torque reaches the commanded value in the order of 8 ms. Although the link stabilized control of the present invention is somewhat slower than the standard field oriented control, this slight reduction in bandwidth is not a significant disadvantage in view of the improved dc bus voltage. This is particularly true, in fact most propulsion systems have mechanical inertia such that in either case the torque response may be considered to be instantaneous.

Figure 17:
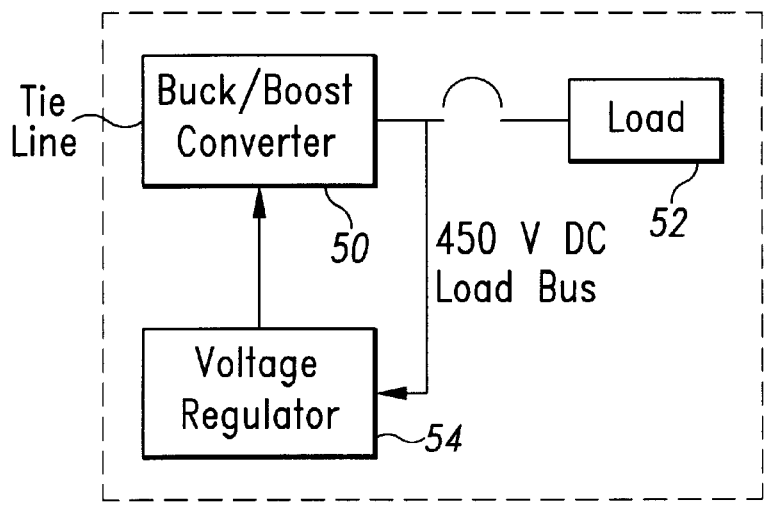
FIG. 17 is a schematic block diagram of a dc/dc converter load which may be controlled by a second embodiment of the present invention.

In addition to the permanent magnet synchronous motor drive control application illustrated hereinabove, those having ordinary skill in the art will recognize that the control function of the present invention has wide applicability in any system consisting of a generation system, a distribution system, and one or more power electronic loads. For example, the system 10 of FIG. 1 may be modified by coupling the tie line 22 to a dc/dc converter load such as that illustrated in FIG. 17. The dc/dc converter 50 of FIG. 17 may be, for example, a buck/boost converter which is used to convert between a voltage of the tie line 22 (for example 300 vdc) to a voltage required by the load 52 (for example 450 vdc). Feedback to the converter 50 is provided by voltage regulator 54.

Figure 18:
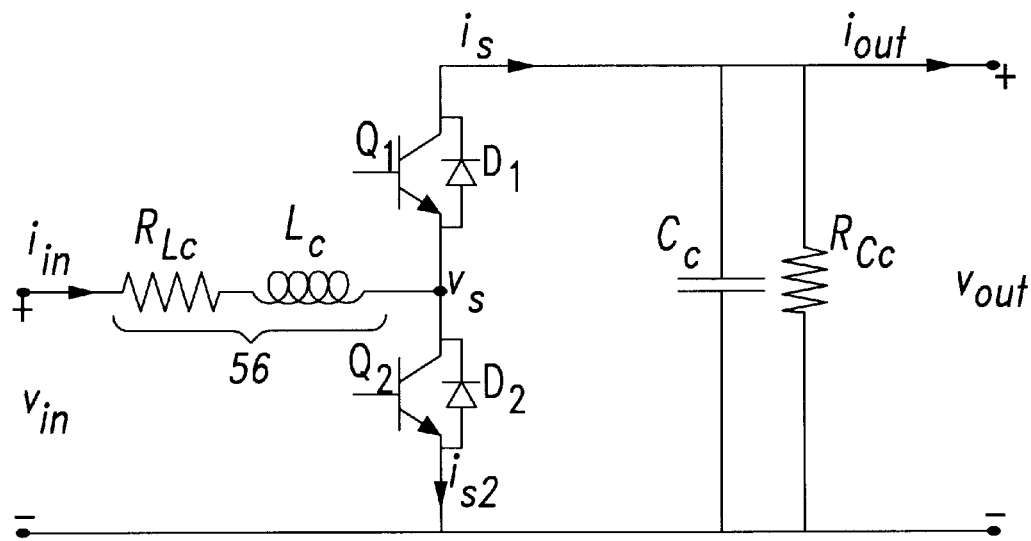
FIG. 18 is a schematic circuit diagram of a buck/boost converter.

Dc-to-dc converters are primarily used to convert power between different dc voltage levels. The circuit diagram shown in FIG. 18 shows the buck/boost converter 50 configuration considered herein.

The operation of the buck/boost converter 50 is as follows. First, the lower semiconductor device $Q_2$ is on, whereupon the current in the inductor 56 ramps up linearly in time. This stores energy in the inductor's magnetic field. Next, the lower switch $Q_2$ is turned off and the upper switch $Q_1$ turned on, so the current passing through the inductor 56 begins to feed the load 52. Since the current cannot change instantaneously, the same current that was going to ground now feeds the load 52. This is possible by the collapse of the magnetic field in the inductor 56, transmitting the stored energy to the load 52. The process is then periodically repeated at a rate known as the switching frequency $f_{sw}$. The average power transmitted to the load 52 is dependent upon the amount of time that the upper switch $Q_1$ is on, $t_{ud}$, versus the period of the switching cycle, $T_{sw}$. The ratio of $t_{ud}$ to $T_{sw}$ is referred to as the duty cycle which is defined as $$d = \frac{t_{ud}}{T_{sw}} = \frac{t_{ud}}{t_{ud} + t_{ld}} \qquad (25)$$

It is assumed that either the upper or lower switch is always on and that both switches are never turned on at the same time, as this would produce a condition called shoot-through wherein the output bus is shorted to ground. In order to model this circuit, it is necessary to define the state variables of the buck/boost converter 50 as the inductor current, $i_{in}$, and the capacitor voltage, $v_{out}$, which are governed by $$pi_{in} = (v_{in} - R_{Lc} \cdot i_{in} - v_s)\frac{1}{L_c} \qquad (26)$$

and $$pv_{out} = \left(i_s - \frac{v_{out}}{R_{Cc}} - i_{out}\right)\frac{1}{C_c} \quad (27)$$

The typical prior art converter 50 control scheme consists of two separate levels. The inner level consists of a hysteresis current controller that regulates the input current of the converter 50 to within plus or minus a given hysteresis level of the commanded input current. Advantages of using hysteresis control are that current ripple is independent of operating conditions and the tight regulation of the input current provides for highly effective current limiting.

Figure 19:
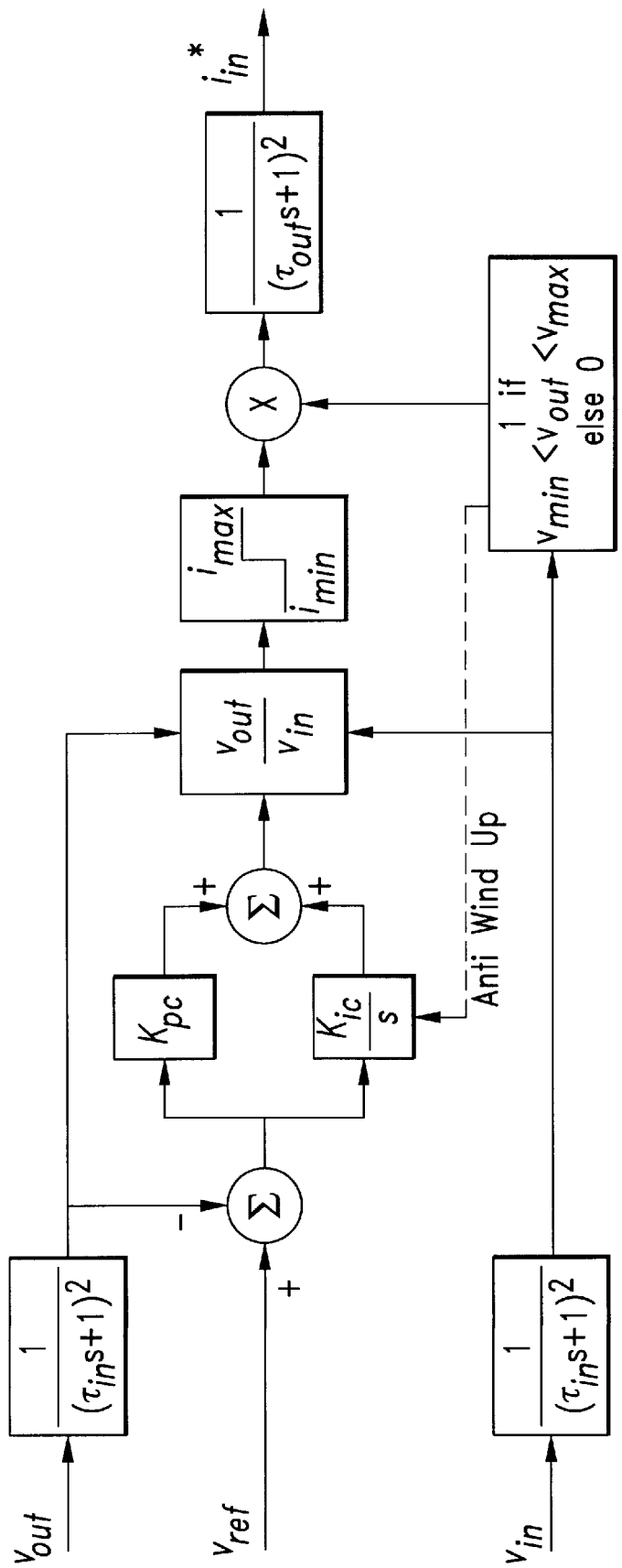
FIG. 19 is a schematic block diagram of a prior art PI control function.

The outer level of the prior art controller, which consists of the supervisory control illustrated in FIG. 19, is used to maintain output voltage regulation. This nonlinear PI controller consists of second order low pass filters used for eliminating aliasing in the measured inputs and for smoothing the controller outputs. The nonlinear block following the PI control converts the output current command to an input current command. System components are protected by limiting the range of the commanded input current following the controller. The conditional block is used to limit the valid operating range of the converter 50 based on the level of the distribution bus voltage, which also provides additional system protection. Values of the limits, time constants, and controller gains are set forth in Table IV.

TABLE IV

DC-to-DC Converter Controller Parameters

| $K_{pc} = 0$ | $K_{ic} = 3.1$ | $\tau_{in} = 30\ \mu s$ |
|---|---|---|
| $\tau_{out} = 5\ \mu s$ | $i_{max} = 15A$ | $i_{min} = 0A$ |
| $v_{max} = 400\ V$ | $v_{min} = 200\ V$ | $v_{ref} = 450\ V$ |

Figure 20:
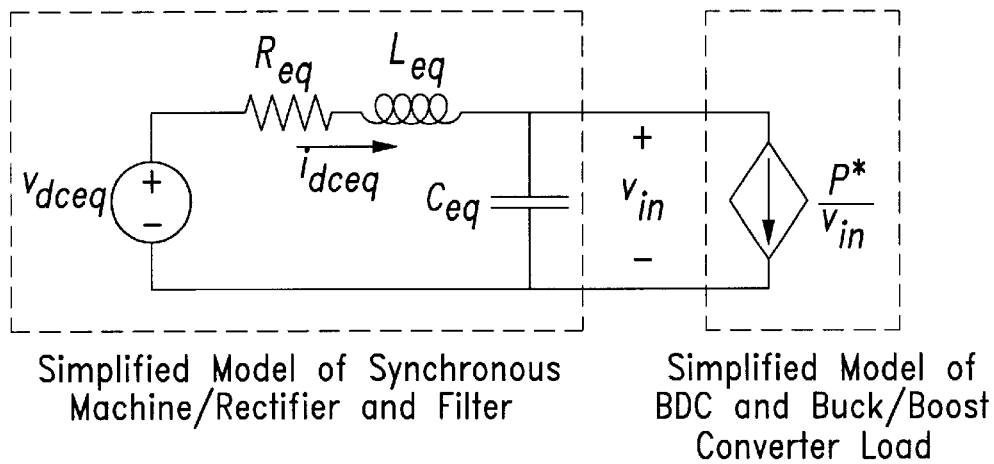
FIG. 20 is a schematic circuit diagram of a simplified model of a synchronous machine, rectifier and filter coupled to the buck/boost converter load of FIG. 18.

The PI controller can be fairly effective in regulating the output voltage of the converter 50 and does not result in system instability for some values of system parameters (particularly if large amounts of bus capacitance are present). However, as is demonstrated hereinbelow, the system can still go unstable unless an appreciable amount of bus capacitance is present. In order to gain insight into the nature of this instability consider the simplified system representation depicted in FIG. 20.

Therein, the synchronous machine is modeled as a voltage behind inductance and resistance. The equivalent resistance, $R_{eq}$, is given by $$R_{eq} = \left[\frac{1}{2}(L_q'' + L_d'') + (L_d'' - L_q'')\sin\left(2\beta + \frac{\pi}{6}\right)\right]\frac{3}{\pi}\omega_{r,sm} + 2r_{s,sm} + r_f \quad (28)$$

where the term in brackets is the synchronous machine 14 commutating inductance, $L''_q$ and $L''_d$ are the synchronous machine 14 q- and d- axis subtransient inductances, $\beta$ is the firing angle related to electrical rotor position, $r_{s,sm}$ is the synchronous machine 14 stator resistance, and $\omega_{r,sm}$ is the synchronous machine 14 electric rotor speed The equivalent inductance is given by $$L_{eq} = \left[L_q'' + L_d'' + (L_d'' - L_q'')\sin\left(2\beta + \frac{\pi}{6}\right)\right] + L_{dc} \quad (29)$$

where the term in brackets is equal to the synchronous machine 14 transient commutating inductance. The source voltage, $V_{dceq}$, may be expressed $$V_{dceq} = \frac{3\sqrt{3}}{\pi}E\cos(\alpha) \quad (30)$$

which is a function of the firing angle relative to the subtransient back flux linkage, $\alpha$, and $$E = \omega_{r,sm}\sqrt{(\lambda_q'')^2 + (\lambda_d'')^2} \quad (31)$$

where $\lambda''_q$ and $\lambda''_d$ are the q- and d-axis subtransient flux linkages. The transmission line 22 is short and can be neglected. The equivalent capacitance, $C_{eq}$, is made up of the sum of the filter 18 capacitance and the dc/dc converter 50 input capacitance. In deriving this model, the synchronous machine exciter 20 and prime move 12 dynamics are neglected since their dynamics are relatively slow.

It is also assumed for this calculation that the buck/boost converter 50 compensates instantaneously to changes in the distribution bus voltage, $v_{in}$, allowing it to be modeled as a single dependent current source. The dependent source is controlled by the assumed constant desired input power, $P^*$, divided by the distribution bus voltage, assuming that the input power is equal to the commanded input power.

The stability of this simplified system can be determined by calculating its pole locations. Differential equations governing the system can be written as $$pi_{dceq} = \frac{V_{dceq} - R_{eq}i_{dceq} - v_{in}}{L_{eq}} \quad (32)$$

and $$pv_{in} = \frac{i_{dceq} - \dfrac{P^*}{v_{in}}}{C_{eq}} \quad (33)$$

Linearizing (32) and (33) and expressing the result in state space form yields $$p\begin{bmatrix}\Delta i_{dceq}\\ \Delta v_{in}\end{bmatrix} = \begin{bmatrix}\dfrac{-R_{eq}}{L_{eq}} & \dfrac{-1}{L_{eq}}\\ \dfrac{1}{C_{eq}} & \dfrac{P^*}{C_{eq}v_{ino}^2}\end{bmatrix}\begin{bmatrix}\Delta i_{dceq}\\ \Delta v_{in}\end{bmatrix} + \begin{bmatrix}\dfrac{1}{L_{eq}}\\ 0\end{bmatrix}[v_{dceq}] \quad (34)$$

The characteristic equation corresponding to (34) is $$\lambda^2 + \left(\frac{R_{eq}}{L_{eq}} - \frac{P^*}{C_{eq}v_{ino}^2}\right)\lambda + \left(\frac{1}{L_{eq}C_{eq}} - \frac{R_{eq}P^*}{L_{eq}C_{eq}v_{ino}^2}\right) = 0 \quad (35)$$

This system will be stable as long as the coefficients in (35) are positive. Therefore, necessary and sufficient conditions for stability are that $$1)\quad P^* < \frac{R_{eq}C_{eq}v_{ino}^2}{L_{eq}} \quad (36)$$

and $$2)\ P^* < \frac{v_{ino}^2}{R_{eq}} \quad (37)$$

It is convenient to state the stability criteria in terms of the small signal input impedance into the constant power load. This impedance is defined as the linearized transfer function between the constant power load input voltage and input current. In particular, for a constant power load $$Z_{in} = -\frac{v_{ino}^2}{P^*} \quad (38)$$

Note that in a small signal sense the constant power load appears as a negative resistance (impedance), which would suggest a destabilizing effect. In terms of the input impedance the stability criteria may be expressed $$1)\ |Z_{in}| > \frac{L_{eq}}{R_{eq}C_{eq}} \quad (39)$$

and $$2)\ |Z_{in}| > R_{eq} \quad (40)$$

Equations (39) and (40) immediately suggest two methods for manipulating system stability. First, stability can be ensured by increasing the capacitance to an appropriate level. However, such measures can be expensive in terms of capital, space, weight and reliability. The second is to manipulate the input impedance of the converter 50. This can be accomplished by adding passive filters at the input to the converter 50, although this can again be an expensive solution. A better solution is to use the nonlinear stabilizing control of the present invention to alter the input impedance characteristics of the converter, thereby ensuring stability of the system.

Figure 21:
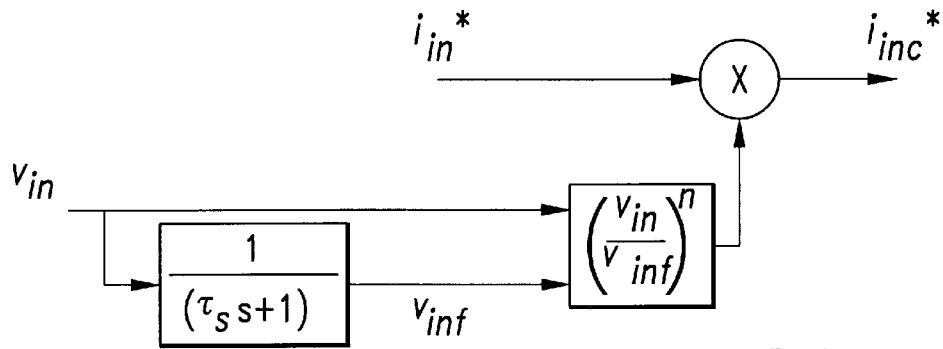
FIG. 21 is a schematic block diagram of a second embodiment nonlinear stabilizing control function of the present invention.

In particular, the nonlinear stabilizing control depicted in FIG. 21 is used to alter the buck/boost converter 50 input impedance so as to maintain system stability. Assuming that the actual input current, $i_{in}$, is equal to the commanded input current, $i_{inc}$, the input impedance of the converter 50 is altered by modulating the commanded input current by the ratio of the input voltage, $v_{in}$, to the filtered input voltage, $v_{inf}$, raised to some power, $$n, \left(\frac{v_{in}}{v_{inf}}\right)^n.$$

This effectively controls how the input voltage effects the input current of the converter 50 by appropriately choosing the filter used in obtaining $v_{inf}$ and the power to which the ratio of $v_{in}$ to $v_{inf}$ is raised. This has the advantage of being very simply implemented and requires no new measurements above those already made by the prior art converter 50 PI control. In addition, the measured variables are strictly local variables so that extensive cabling and possible additional hardware is not needed as would be the case for some other methods of modulating the absorbed input power of the converter 50. However, before discussing the system stabilizing controller it is instructive to set forth a more general stability criteria for designing the controller.

Figure 22:
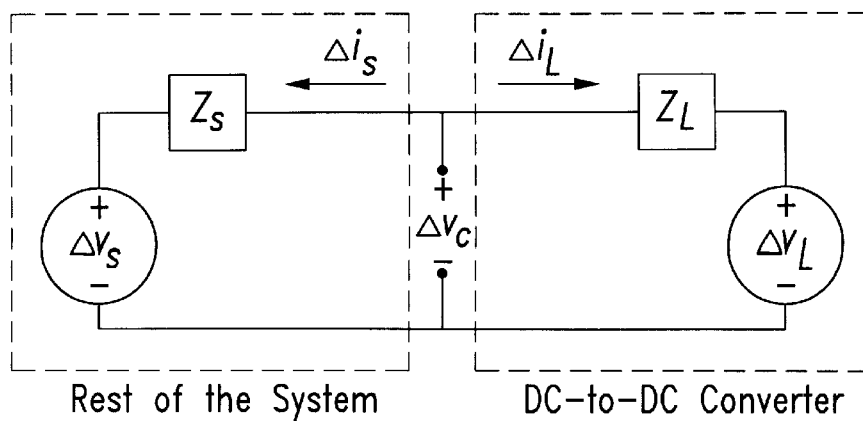
FIG. 22 is a schematic block diagram of a synchronous machine, rectifier, filter and turbine coupled to a dc/dc converter load in which the system is represented as a single source and a single load.

In explaining the physical cause of the negative impedance instability hereinabove, a very specific stability criteria was utilized. In order to perform a detailed controller design, a generalized criteria is necessary. In order to develop such general impedance based stability criteria, consider FIG. 22. Therein the system is divided into a single 'source' and a single 'load', each of which may represent the parallel combination of a number of elements. For example, in the specific case of the system of interest the source will consist of the synchronous machine 14, rectifier 16, filter 18, and turbine 12 while the load will consist of the dc/dc converter 50. Next, it is convenient to express the source and load impedance as $$Z_s = \frac{N_s}{D_s} \quad (41)$$

and $$Z_L = \frac{N_L}{D_L} \quad (42)$$

Whereupon the transfer function between a change in load current and a disturbance in the difference between the thevenin equivalent voltages can be expressed as $$\frac{\Delta i_L}{\Delta v_s - \Delta v_L} = \frac{D_s D_L}{N_s D_L + N_L D_s} \quad (43)$$

In order to ensure that the denominator has only stable poles, it is convenient to assume that the polynomials $N_L$ and $D_s$ minimum phase, whereupon $$\frac{\Delta i_L}{\Delta v_s - \Delta v_L} = \frac{D_L}{N_L\left(1 + \frac{Z_s}{Z_L}\right)} \quad (44)$$

Figure 23:
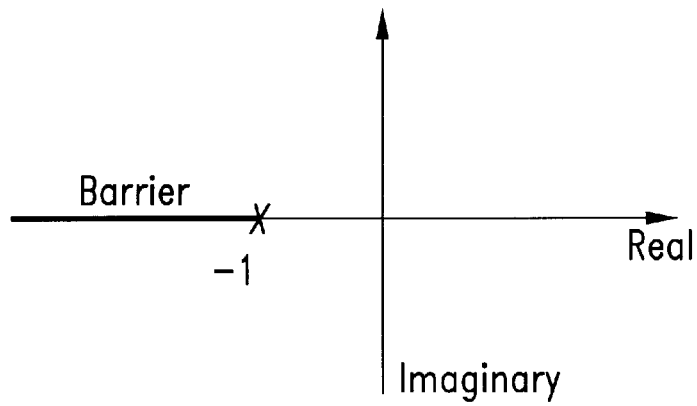
FIG. 23 is a graph of a stability criteria for the circuit of FIG. 22.

Since $N_s$ is assumed to be minimum phase, stability is guaranteed provided that the Nyquist plot of $Z_s/Z_L$ does not encircle the −1 point. A simplified sufficient (though not necessary) criteria for stability is derived by constructing an artificial barrier in the complex plane as depicted in FIG. 23.

Clearly, the Nyquist plot of $Z_s/Z_L$ cannot encircle −1 unless it crosses the barrier. This leads to an impedance based stability criteria In particular, stability is guaranteed if $$|Z_L| < |Z_s| \quad (45)$$

when $$\angle Z_L = \angle Z_s \pm n360 + 180° \quad (46)$$

In order to use this stability criteria, a Bode plot of the phase and magnitude of the source impedance are made. Then as long as the magnitude of the load impedance is less than the source impedance at the point where the load phase is equal to or greater than the critical phase the system will be stable, provided of course that the polynomials $N_L$ and $D_s$ are minimum phase.

The effect of the nonlinear stabilizing control on the load input impedance can now be explored. The commanded input current of the converter 50 can be written in terms of the desired input current as shown in FIG. 21 or in terms of the desired input power as $$i^*_{inc} = \frac{v_{in}^{(n-1)}}{v_{inf}^n} p^* \quad (47)$$

Assuming that the desired power is constant, linearizing equation (47) yields $$\Delta i^*_{inc} = \frac{(n-1)v_{ino}^{(n-2)} p^*}{v_{info}^n} \Delta v_{in} + \frac{(-n)v_{ino}^{(n-1)} p^*}{v_{info}^{(n+1)}} \Delta v_{inf} \quad (48)$$

From FIG. 21, $$\Delta v_{inf} = H(s)\Delta v_{in} \quad (49)$$

This filter is designed such that $H(0)=1$. Therefore $$v_{ino} = v_{info} \quad (50)$$

Incorporating (49) and (50) into (48)

$$\Delta i^*_{inc} = \frac{(n-1)P^*}{v_{ino}^2} \Delta v_{in} + \frac{(-n)P^*}{v_{ino}^2} H(s)\Delta v_{in} \quad (51)$$

The input admittance can then be determined about the operating point, assuming that the actual input current is always equal to the commanded input current, in particular $$Y^*_{inc}(s) = \frac{\Delta i^*_{inc}}{\Delta v_{in}} = \frac{(n-1)P^*}{v_{ino}^2} + \frac{(-n)P^*}{v_{ino}^2} H(s) \quad (52)$$

Inverting the admittance yields the input impedance:

$$Z_{inc}(s) = \frac{v_{ino}^2}{[n(1-H(s))-1]P^*} \quad (53)$$

As can be seen, the nonlinear stabilizing control offers many possibilities for input impedance control by adjusting n and H(s). First, setting 'n' equal zero yields $$Z_{inc}(s) = \frac{-v_{ino}^2}{P^*} \quad (n=0) \quad (54)$$

whereupon it can be seen that the stabilizing control has no effect.

If 'n' is set equal to one it can be seen that with proper choice of H(s) the input impedance can be readily manipulated.

$$Z_{inc} = \frac{-v_{ino}^2}{H(s)P^*} \quad (n=1) \quad (55)$$

Setting 'n' equal to two yields $$Z_{inc} = \frac{v_{ino}^2}{[1-2H(s)]P^*} \quad (n=2) \quad (56)$$

In this case, and for higher powers, it can be seen that 'n' acts as a gain on the filter. Although only integer values have been discussed herein, 'n' is in the set of real numbers and does not have to be an integer.

Figure 24:
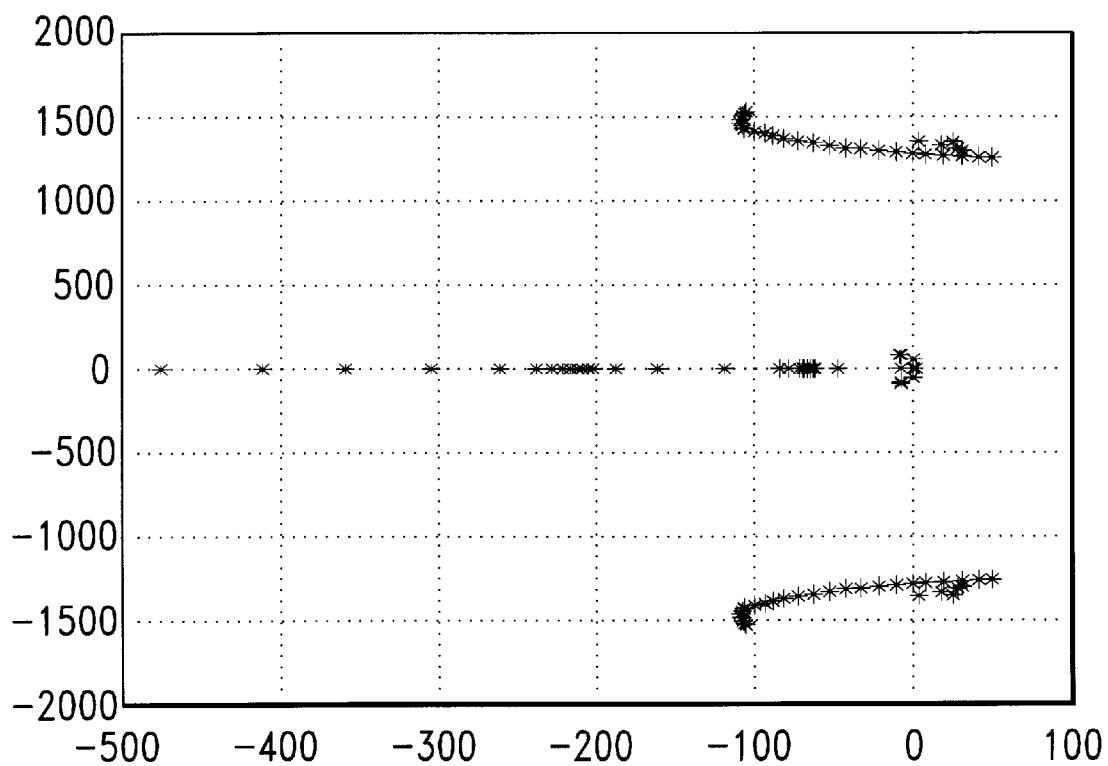
FIG. 24 is a partial root locus diagram of the system poles of a second embodiment control function of the present invention in which the parameter $\tau_s$ is varied.

Insight into how the stabilizing controller of the present invention affects the input impedance of the converter 50 has been given hereinabove, but this does not offer a way of choosing either parameter. As stated before, the exemplary controller used here sets n equal to one, leaving only the time constant in H(s) to be chosen, assuming a first order low pass filter with unity gain at dc. In order to facilitate a means of making this choice, a computer simulation was used to generate the pole locations from the average value model for values of $\tau_s$ spanning the frequency range of 1500 to 50 rad/sec, in 50 radian steps. This was done with the bus filter capacitance effectively removed from the system. The most interesting poles were then plotted in the complex plane creating a root locus in terms of the filter time constant, as shown in FIG. 24. From the root locus, a value of $\tau_s=2$ ms was chosen that offered significantly high damping but still maintained a fairly high cutoff frequency so that the system stability was guaranteed and performance degradation was minimized.

This type of stabilizing control of the present invention offers many possibilities in the maintenance of system stability affected by constant power loads. Here the gain term 'n' was set equal to one, and the time constant of the filter was changed to guarantee stability in the case of lost bus capacitance. Those having ordinary skill in the art will recognize that there are many other possibilities, such as maximizing the performance of the stabilizing controller of the present invention in terms of 'n' or $\tau_s$ or even changing the filter configuration to that of a higher order low pass or stop band filter depending on the particular component and system requirements.

Figure 25:
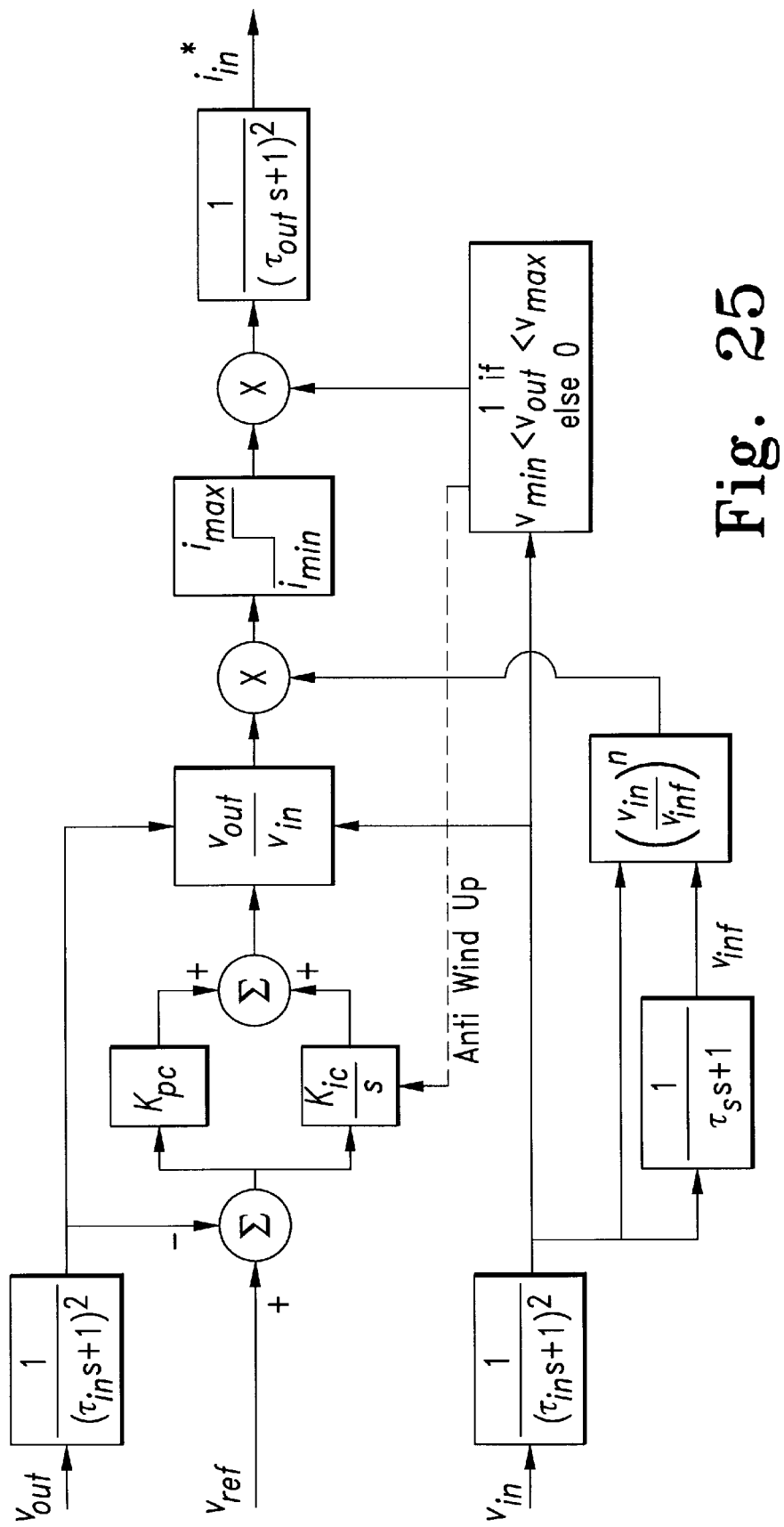
FIG. 25 is a schematic block diagram illustrating the second embodiment nonlinear stabilizing control function of FIG. 21 integrated with the prior art PI control function of FIG. 19.

The complete diagram of the converter 50 control of the present invention, including both the PI control as well as the system stabilizing control is depicted in FIG. 25.

Figure 26:
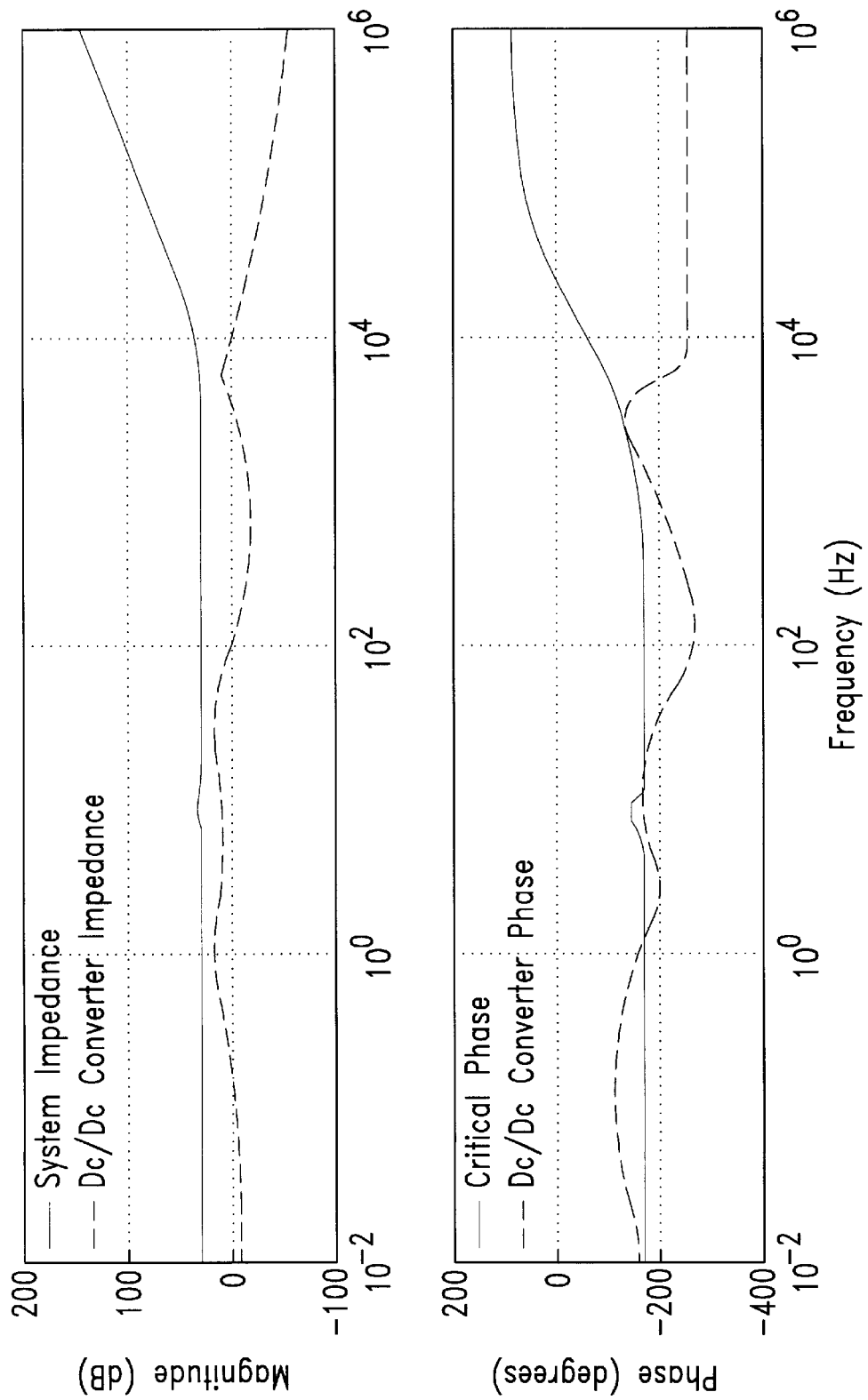
FIG. 26 is a graph of impedance criteria of the system of FIG. 22 using a prior art control function.
Figure 28:
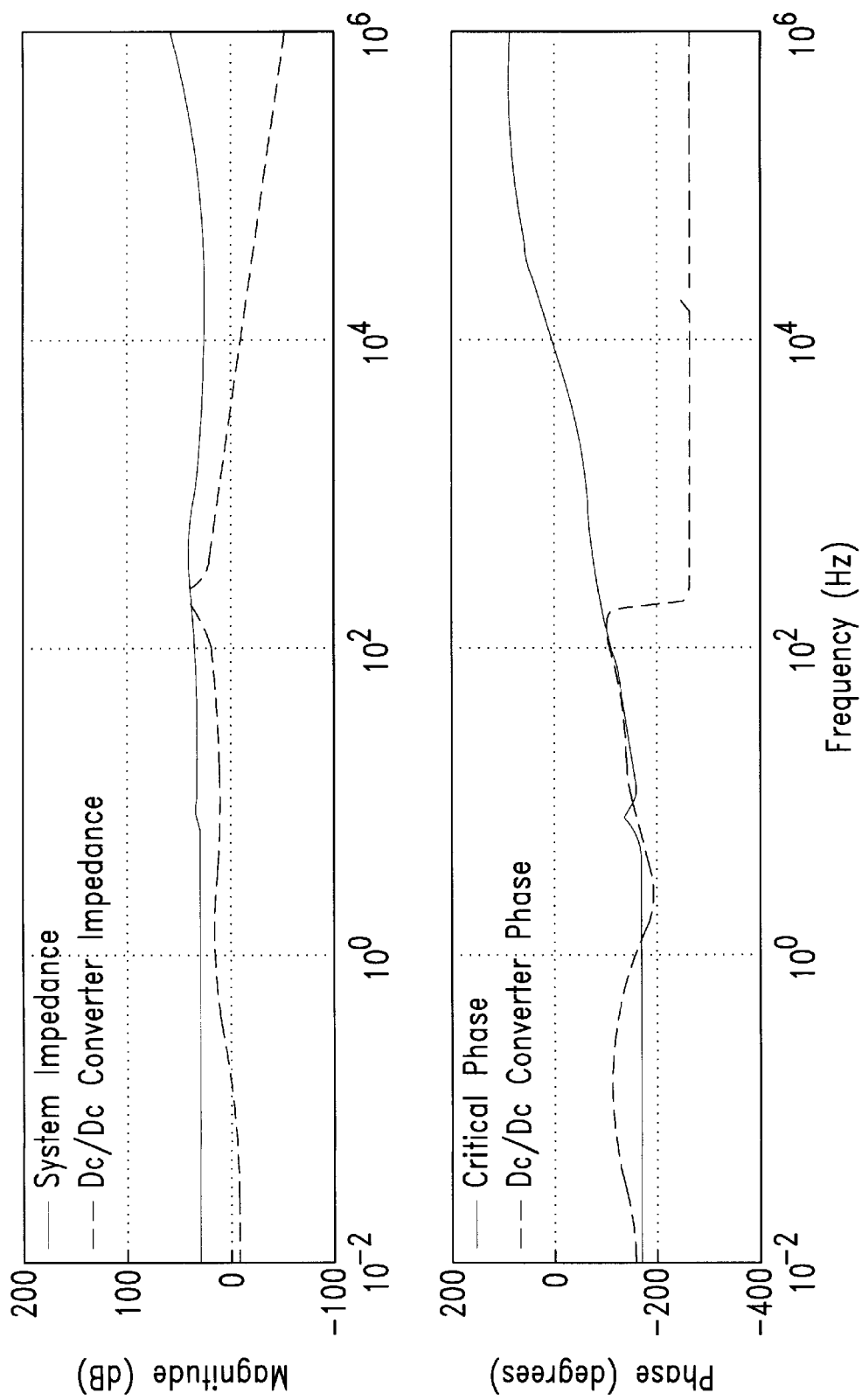
FIG. 28 is a graph of impedance criteria of the system of FIG. 22 using the second embodiment control function of the present invention, with lost capacitance.

In order to verify that the choice made of the filter time constant, $\tau_s$, actually forces the input impedance of the dc/dc converter 50 to fall within the stable region of the generalized criteria, the average value model was used to generate input impedance Bode plots with and without the stabilizing control of the present invention. FIGS. 26 and 28 illustrate the effectiveness of the nonlinear control of the present invention in shaping the input impedance of the dc/dc converter 50. FIG. 26 is of the converter 50 input impedance (with the original prior art control) plotted over top of the magnitude of the impedance looking back into the rest of the system and the critical phase derived from the phase of the impedance looking back into the rest of the system, from the input side of the converter 50. It can be clearly seen that the system is stable since the magnitude of the converter input impedance is always less than the system output impedance.

Figure 27:
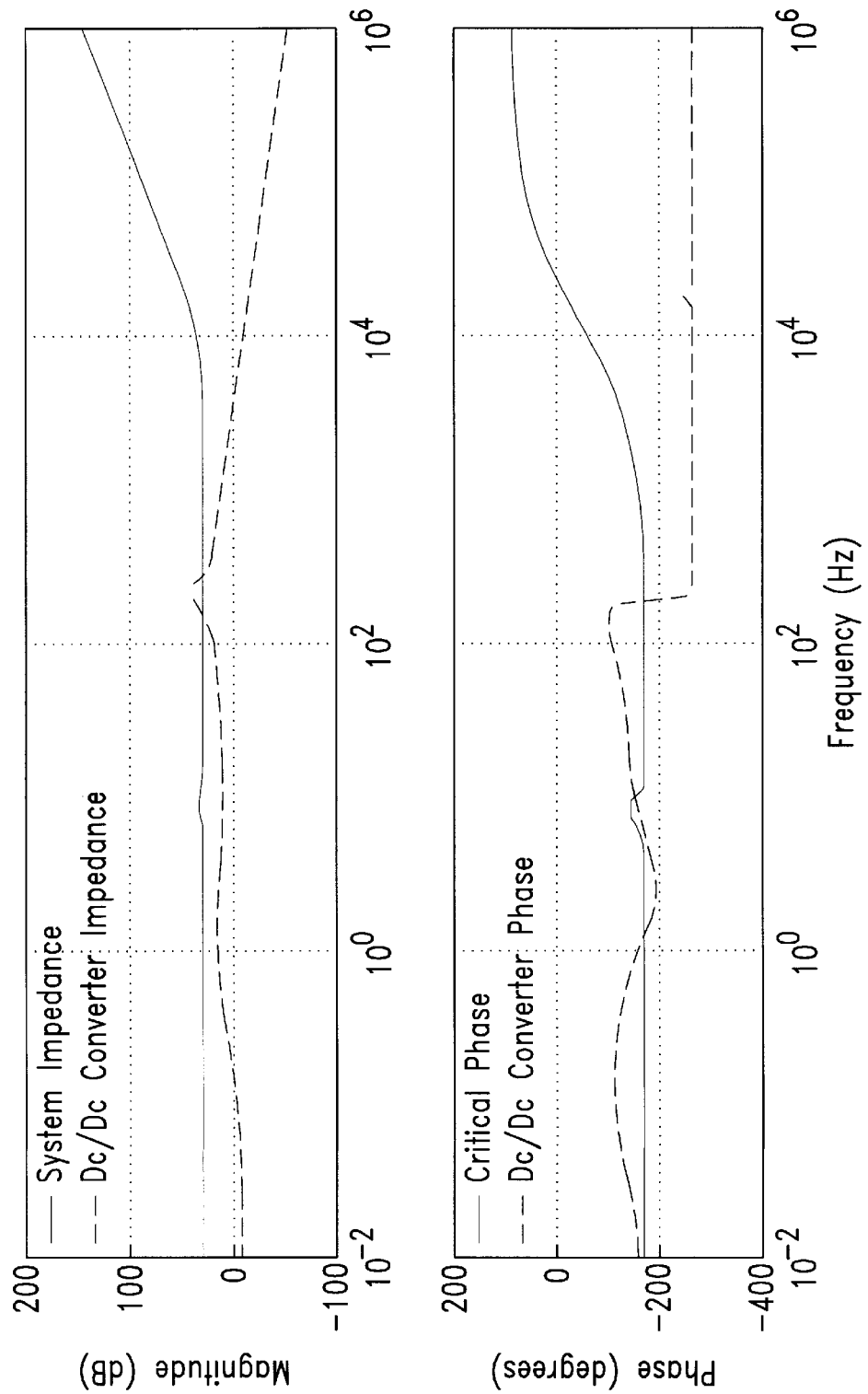
FIG. 27 is a graph of impedance criteria of the system of FIG. 22 using a prior art control function, with lost capacitance.

FIG. 27 depicts the impedance criteria diagram with the loss in generation bus capacitance. Here the converter 50 input impedance is larger in magnitude than the system output impedance for a small range of frequency. According to the stability criteria established in equations (45) through (47), the system is clearly unstable since the phase of the converter 50 input impedance is greater than the critical phase during a portion of the same range of frequency.

The effect of the stabilizing controller of the present invention on the impedance criteria is illustrated in FIG. 28. The magnitude of the converter 50 input impedance still slightly crosses the magnitude of the system output impedance, though not for as large of a frequency range. The important detail is that the phase of the converter 50 input impedance no longer crosses the critical phase during the same range, thereby guaranteeing system stability.

Figure 29:
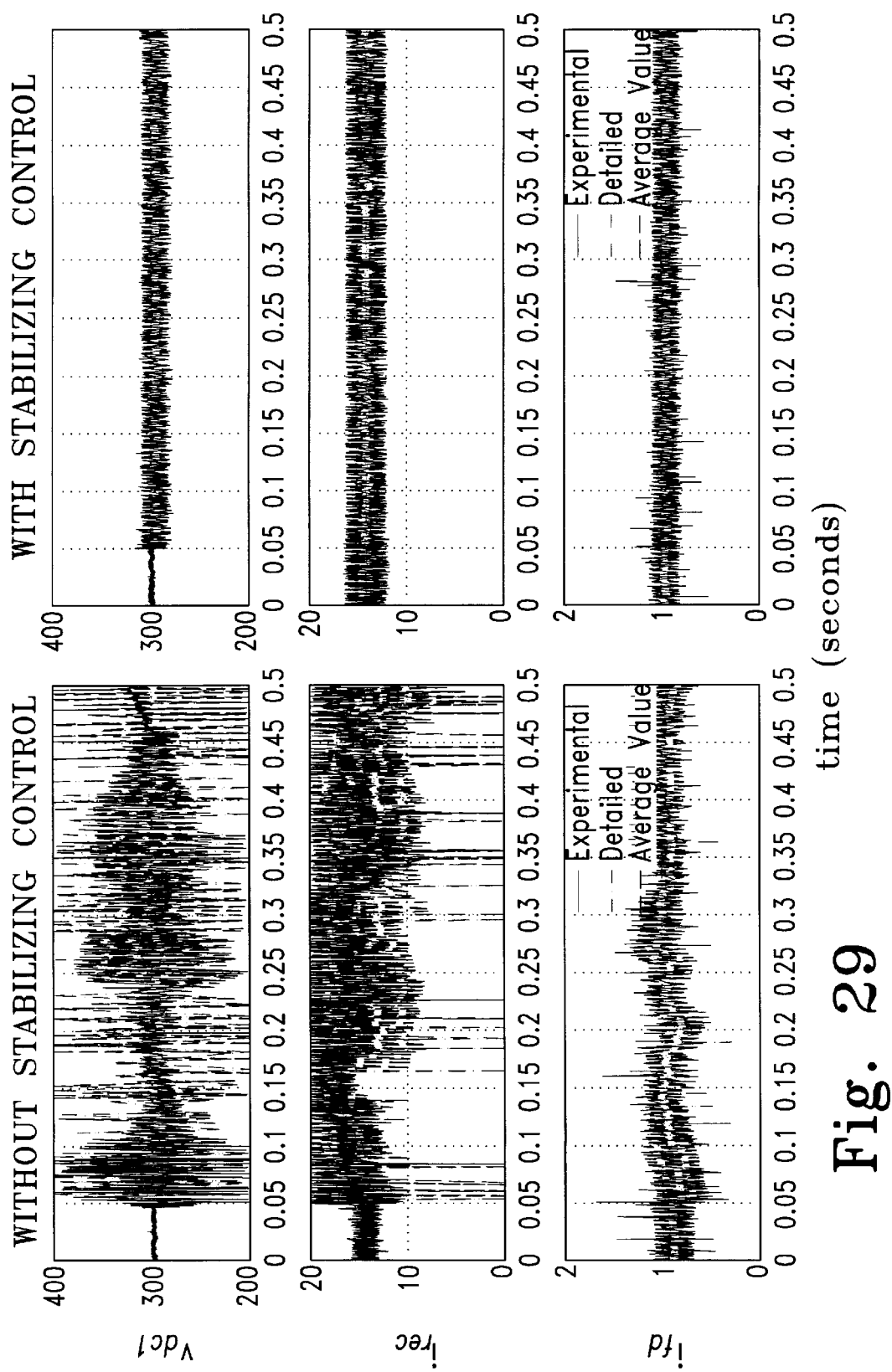
FIG. 29 is a graph of source variable transients for the system of FIG. 22 both with and without the second embodiment control function of the present invention, illustrating the effects of a loss of bus capacitance.
Figure 30:
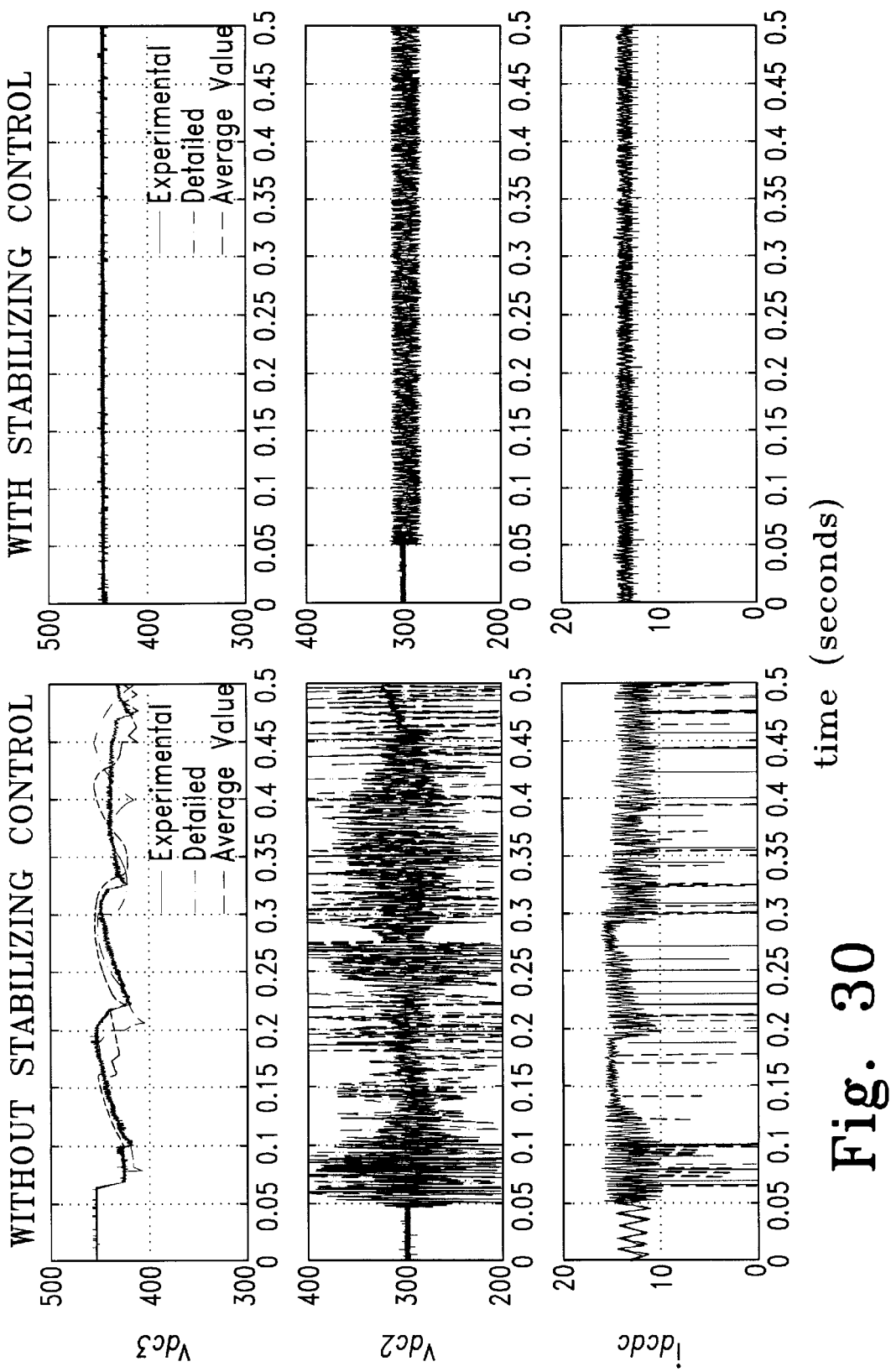
FIG. 30 is a graph of load variable transients for the system of FIG. 22 both with and without the second embodiment control function of the present invention, illustrating the effects of a loss of bus capacitance.

In order to verify that the stabilizing control with the choice of the filter time constant, $\tau_s$, actually stabilizes the system, average value and detailed simulations were performed followed by hardware validation. FIGS. 29 and 30 depict the source and load variables for the system 10 having the converter 50 load, in which the filter capacitance connected to the generation bus is stepped from 1315.5 uF to 1.4 uF. Data is shown for the system both with and without the stabilizing control of the present invention. The effect of the system stabilizing controller is dramatically seen: the once unstable system is now stable. Notice though in FIG. 29 that the generation bus voltage does undergo increased variation; however, this is due to increased rectifier harmonics since the source filter capacitance has been effectively removed The stabilizing controller of the present invention has the desired effect.

CONCLUSION

A straightforward but nonlinear stabilizing control function has been set forth hereinabove which can be used to mitigate negative impedance instabilities in power electronic power systems, power electronic propulsion systems, etc. The effectiveness of the control has been demonstrated both through the use of computer simulation and in the laboratory. In addition to being applicable to induction motor based drives, the control algorithm could also be used with other types of machines in which rapid torque control is possible, most notably permanent magnet synchronous machines, used in submarines, ships, hybrid electric and electric vehicles (both commercial and tactical), aircraft, spacecraft, and in power electronics based autonomous generation systems (such as for construction sites and third world use), etc. Other applications will be apparent to those having ordinary skill in the art.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for controlling negative impedance instability of a system caused by a power electronic load coupled to a source of electric power, comprising the steps of:
   a) selecting a signal in the system that is proportional to the instantaneous input power to the load;
   b) determining a measured voltage by measuring an input voltage received from said source by said load;
   c) determining a filtered voltage by filtering said measured voltage;
   d) computing a control factor as $$\left(\frac{\text{said measured voltage}}{\text{said filtered voltage}}\right)^n$$

wherein n is a predetermined real number;
   e) determining a control signal by multiplying said first signal by said control factor; and
   f) applying said control signal to said load in order to set an operating state of said system.

2. The method of claim 1, wherein step (c) comprises applying a first order filter to said measured voltage.

3. The method of claim 1, wherein n is an integer.

4. The method of claim 1, wherein said load comprises an induction motor, an inverter controlling said induction motor, and a control circuit controlling said inverter.

5. The method of claim 4, wherein step (f) comprises applying said control signal to said control circuit in order to set an operating state of said system.

6. The method of claim 5, wherein said first signal is a desired torque of said induction motor.

7. The method of claim 6, wherein said control signal is a commanded torque applied to said control circuit.

8. The method of claim 1, wherein said load comprises a dc/dc converter.

9. The method of claim 8, wherein step (a) comprises selecting an input current indicative of a desired operating state of said converter.

10. The method of claim 8, wherein step (f) comprises applying said control signal to said converter in order to set an operating state of said converter.

11. A method for controlling negative impedance instability of an electric propulsion system coupled to a source of electric power, comprising the steps of:
   a) providing said electric propulsion system comprising an induction motor, an inverter controlling said induction motor, and a control circuit controlling said inverter;
   b) receiving an input command indicative of a desired torque of said induction motor;
   c) determining a measured voltage by measuring an input voltage received from said source by said electric propulsion system;
   d) determining a filtered voltage by filtering said measured voltage;
   e) computing a control factor as $$\left(\frac{\text{said measured voltage}}{\text{said filtered voltage}}\right)^n$$

wherein n is a predetermined real number;
   f) determining a control signal by multiplying said input command by said control factor; and
   g) applying said control signal to said control circuit in order to determine a commanded torque of said induction motor.

12. The method of claim 11, wherein step (d) comprises applying a first order filter to said measured voltage.

13. The method of claim 11, wherein n is an integer.

14. A method for controlling negative impedance instability of a dc/dc converter coupled to a source of electric power, comprising the steps of:
   a) receiving an input command indicative of a desired operating state of said converter;
   b) determining a measured voltage by measuring an input voltage received from said source by said converter;

c) determining a filtered voltage by filtering said measured voltage;

d) computing a control factor as $$\left(\frac{\text{said measured voltage}}{\text{said filtered voltage}}\right)^n$$

wherein n is a predetermined real number;

e) determining a control signal by multiplying said input command by said control factor; and f) applying said control signal to said converter in order to set an operating state of said converter.

15. The method of claim 14, wherein step (d) comprises applying a first order filter to said measured voltage.

16. The method of claim 14, wherein n is an integer.

* * * * *

UNITED STATES PATENT AND TRADEMARK OFFICE
CERTIFICATE OF CORRECTION

PATENT NO. : 6,051,941
DATED : April 18, 2000
INVENTOR(S) : Sudhoff et al.

It is certified that error appears in the above-identified patent and that said Letters Patent is hereby corrected as shown below:

Column 7,
Line 33, please insert a period after "command".

Column 8,
Lines 1, and 34, please change "v" to -- $\square$ --.

Column 9,
Line 11, pleaser change "$v_{es}$" to -- $\Delta v_{es}$ --.
Line 43, please change "$\tau$ = ms" to -- $\tau$ = 4ms --.

Column 13,
Line 58, please insert a period after "speed".

Column 16,
Line 48, please insert a period after "criteria".

Column 18,
Line 41, please change "de/dc" to -- dc/dc --.

Column 19,
Line 12, please insert a period after "removed".

Signed and Sealed this

Fourth Day of December, 2001

Attest:

NICHOLAS P. GODICI
Attesting Officer   Acting Director of the United States Patent and Trademark Office